(12) United States Patent
Mital et al.

(10) Patent No.: US 12,694,143 B2
(45) Date of Patent: *Jul. 28, 2026

(54) FEDERATED IDENTITY MANAGEMENT FOR DATA REPOSITORIES

(71) Applicant: Cyral Inc., Milpitas, CA (US)

(72) Inventors: Manav Ratan Mital, Mountain View, CA (US); Srinivas Nageswarrao Vadlamani, San Jose, CA (US); Pramod Chandraiah, Pleasanton, CA (US); Hugo Araújo de Sousa, Belo Horizonte (BR)

(73) Assignee: Varonis Systems Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/750,627

(22) Filed: Jun. 21, 2024

(65) Prior Publication Data

US 2024/0348610 A1      Oct. 17, 2024

Related U.S. Application Data

(63) Continuation of application No. 17/496,314, filed on Oct. 7, 2021, now Pat. No. 12,058,133, which is a
(Continued)

(51) Int. Cl.
*G06F 21/62*          (2013.01)
*G06F 11/30*          (2006.01)
(Continued)

(52) U.S. Cl.
CPC ...... *G06F 21/6218* (2013.01); *G06F 11/3006* (2013.01); *G06F 11/3438* (2013.01);
(Continued)

(58) Field of Classification Search
CPC ............. G06F 21/6218; G06F 11/3006; G06F 11/3438; G06F 11/3476; G06F 16/24547;
(Continued)

(56) References Cited

U.S. PATENT DOCUMENTS 6,078,902 A      6/2000   Schenkler
6,275,818 B1    8/2001   Subramanian
(Continued)

FOREIGN PATENT DOCUMENTS

CA          2647997 A1 *  10/2007   ............. G06F 21/00
CN          1653783         6/2010
(Continued)

OTHER PUBLICATIONS

Anwar et al., From Intrusion Detection to an Intrusion Response System: Fundamentals, Requirements, and Future Directions, Algorithms, MDPI, published Mar. 27, 2017, pp. 1-24.
(Continued)

*Primary Examiner* — Sher A Khan
(74) *Attorney, Agent, or Firm* — Thorpe North & Western, LLP.

(57)                ABSTRACT
A method and system for performing federated identity management are described. The method and system include receiving a communication for a data source at a wrapper. The wrapper includes a dispatcher and a service. The dispatcher receives the communication and is data agnostic. The communication corresponds to end user credentials for an end user. The method and system include providing the communication from the dispatcher to the data source and to the service. The method and system also use the service to authenticate the end user based on the end user credentials and utilizing federated identity management.

15 Claims, 10 Drawing Sheets

Related U.S. Application Data continuation of application No. 16/548,742, filed on Aug. 22, 2019, now Pat. No. 11,223,622.

(60) Provisional application No. 62/840,847, filed on Apr. 30, 2019, provisional application No. 62/758,223, filed on Nov. 9, 2018, provisional application No. 62/733,013, filed on Sep. 18, 2018.

(51) Int. Cl.

| | |
|---|---|
| *G06F 11/34* | (2006.01) |
| *G06F 16/2453* | (2019.01) |
| *G06F 21/31* | (2013.01) |
| *G06F 21/60* | (2013.01) |
| *H04L 9/40* | (2022.01) |
| *H04L 69/326* | (2022.01) |
| *H04L 69/329* | (2022.01) |

(52) U.S. Cl.

CPC .... *G06F 11/3476* (2013.01); *G06F 16/24547* (2019.01); *G06F 21/31* (2013.01); *G06F 21/604* (2013.01); *G06F 21/6227* (2013.01); *G06F 21/6254* (2013.01); *H04L 63/0281* (2013.01); *H04L 63/0884* (2013.01); *H04L 63/101* (2013.01); *H04L 63/102* (2013.01); *H04L 63/104* (2013.01); *H04L 63/105* (2013.01); *H04L 63/1425* (2013.01); *H04L 63/166* (2013.01); *H04L 63/168* (2013.01); *H04L 69/326* (2013.01); *H04L 69/329* (2013.01); *G06F 2221/2107* (2013.01); *H04L 2463/082* (2013.01)

(58) Field of Classification Search

CPC .... G06F 21/31; G06F 21/604; G06F 21/6227; G06F 21/6254; G06F 2221/2107; H04L 63/0281; H04L 63/0884; H04L 63/101; H04L 63/102; H04L 63/104; H04L 63/105; H04L 63/1425; H04L 63/166; H04L 63/168; H04L 69/326; H04L 69/329; H04L 67/01; H04L 2463/082; H04L 63/0245; H04L 63/0421; H04L 63/0428; H04L 63/08; H04L 9/40; H04L 9/32; H04L 9/3213; H04L 9/3226; H04L 63/14

See application file for complete search history.

(56) References Cited

U.S. PATENT DOCUMENTS

| | | | |
|---|---|---|---|
| 7,490,153 B1 | 2/2009 | Krishnan | |
| 7,664,806 B1 | 2/2010 | Koudas | |
| 7,877,377 B2 | 1/2011 | Day | |
| 7,895,649 B1 | 2/2011 | Brook | |
| 7,899,047 B2 | 3/2011 | Cabrera | |
| 8,447,983 B1 | 5/2013 | Beck | |
| 8,793,805 B1 | 7/2014 | Johansson | |
| 8,867,743 B1 | 10/2014 | Salvaji | |
| 8,869,257 B2 * | 10/2014 | Ahn | H04L 63/20 726/19 |
| 8,892,868 B1 | 11/2014 | Jenks | |
| 8,935,802 B1 | 1/2015 | Mattsson | |
| 8,959,633 B1 | 2/2015 | Dokey | |
| 8,978,152 B1 | 3/2015 | Rozenberg | |
| 9,053,297 B1 * | 6/2015 | Fitch | H04L 63/168 |
| 9,088,450 B2 * | 7/2015 | Jung | H04L 41/00 |
| 9,106,642 B1 | 8/2015 | Bhimanaik | |
| 9,117,062 B1 | 8/2015 | Fitch | |
| 9,137,131 B1 | 9/2015 | Sarukkai | |
| 9,167,120 B2 | 10/2015 | Fallon | |
| 9,231,940 B2 | 1/2016 | Counterman | |
| 9,338,007 B1 | 5/2016 | Doshi | |
| 9,374,370 B1 | 6/2016 | Bent, II | |
| 9,432,342 B1 | 8/2016 | Kothari | |
| 9,467,437 B2 | 10/2016 | Krishnaprasad | |
| 9,479,532 B1 | 10/2016 | Gerlach | |
| 9,485,256 B1 * | 11/2016 | Jerrard-Dunne | H04L 63/101 |
| 9,635,011 B1 | 4/2017 | Wu | |
| 9,693,181 B1 | 6/2017 | Albouyeh | |
| 9,703,965 B1 * | 7/2017 | Robinson | H04L 9/085 |
| 9,729,539 B1 | 8/2017 | Agrawal | |
| 9,800,474 B1 | 10/2017 | Bush | |
| 9,807,068 B1 | 10/2017 | Golwalkar | |
| 9,819,648 B1 | 11/2017 | Chilakapati | |
| 9,917,817 B1 | 3/2018 | Lad | |
| 9,954,828 B1 * | 4/2018 | Chandrasekhar | H04L 9/0894 |
| 9,954,830 B2 | 4/2018 | Barnett | |
| 10,025,941 B1 | 7/2018 | Griffin | |
| 10,043,036 B1 | 8/2018 | Dawkins | |
| 10,051,079 B1 | 8/2018 | Kaukl | |
| 10,164,944 B1 | 12/2018 | Felstaine | |
| 10,164,973 B1 | 12/2018 | Prasad | |
| 10,171,423 B1 | 1/2019 | Woodberg | |
| 10,192,072 B1 | 1/2019 | Galvin, Jr. | |
| 10,318,762 B1 | 6/2019 | Buckingham | |
| 10,382,203 B1 | 8/2019 | Loladia | |
| 10,387,670 B2 | 8/2019 | Hosie | |
| 10,402,808 B1 | 9/2019 | Peterson | |
| 10,404,703 B1 | 9/2019 | Peterson | |
| 10,416,966 B2 | 9/2019 | Barday | |
| 10,425,402 B2 * | 9/2019 | D'Souza | H04L 63/0421 |
| 10,469,425 B1 | 11/2019 | Conley | |
| 10,482,231 B1 | 11/2019 | Harding | |
| 10,484,415 B1 | 11/2019 | Peterson | |
| 10,541,982 B1 | 1/2020 | Lee | |
| 10,692,138 B1 | 6/2020 | Nguyen | |
| 10,827,026 B1 | 11/2020 | Kaukl | |
| 10,885,133 B1 | 1/2021 | Maida, IV | |
| 10,936,738 B1 | 3/2021 | Roberts | |
| 10,963,590 B1 | 3/2021 | Dash | |
| 10,986,081 B1 | 4/2021 | Mcadams | |
| 11,032,280 B1 | 6/2021 | Chhabra | |
| 11,089,028 B1 | 8/2021 | Alpaugh | |
| 11,115,417 B2 | 9/2021 | Khait | |
| 11,223,622 B2 | 1/2022 | Mital | |
| 11,410,173 B1 | 8/2022 | Stickle | |
| 2002/0046275 A1 | 4/2002 | Crosbie | |
| 2002/0055980 A1 | 5/2002 | Goddard | |
| 2003/0065711 A1 | 4/2003 | Acharya | |
| 2003/0154406 A1 | 8/2003 | Honarvar | |
| 2004/0002878 A1 | 1/2004 | Maria Hinton | |
| 2004/0266533 A1 | 12/2004 | Gentles | |
| 2005/0289341 A1 | 12/2005 | Ritola | |
| 2006/0021010 A1 * | 1/2006 | Atkins | H04L 9/40 726/5 |
| 2006/0075228 A1 | 4/2006 | Black | |
| 2006/0075475 A1 * | 4/2006 | Boulos | H04L 63/0815 726/6 |
| 2006/0167810 A1 | 7/2006 | Bhambri | |
| 2006/0210071 A1 | 9/2006 | Chandran | |
| 2007/0061318 A1 | 3/2007 | Azizi | |
| 2007/0118875 A1 | 5/2007 | Chow | |
| 2007/0130326 A1 * | 6/2007 | Raphael | H04L 41/0226 709/224 |
| 2007/0226785 A1 | 9/2007 | Chow | |
| 2007/0289006 A1 * | 12/2007 | Ramachandran | H04L 63/08 726/10 |
| 2008/0127323 A1 | 5/2008 | Soin | |
| 2008/0168539 A1 * | 7/2008 | Stein | H04L 63/0815 726/5 |
| 2008/0178010 A1 | 7/2008 | Vaterlaus | |
| 2008/0201772 A1 | 8/2008 | Mondaeev | |
| 2008/0262990 A1 | 10/2008 | Kapoor | |
| 2008/0262991 A1 | 10/2008 | Kapoor | |
| 2009/0046726 A1 | 2/2009 | Cabrera | |
| 2009/0077011 A1 | 3/2009 | Natarajan | |
| 2009/0125972 A1 * | 5/2009 | Hinton | G06F 21/41 726/1 |
| 2009/0158394 A1 | 6/2009 | Oh | |
| 2009/0248804 A1 | 10/2009 | Ohtani | |

(56)  References Cited

U.S. PATENT DOCUMENTS

| | | | |
|---|---|---|---|
| 2009/0288149 A1 | 11/2009 | Kolluru | |
| 2009/0307200 A1 | 12/2009 | Ignat | |
| 2010/0067402 A1 | 3/2010 | Navarro | |
| 2010/0070754 A1 | 3/2010 | Leach | |
| 2010/0077457 A1 | 3/2010 | Xu | |
| 2010/0274892 A1 | 10/2010 | Legrand | |
| 2010/0281541 A1 | 11/2010 | Stolfo | |
| 2010/0332845 A1 | 12/2010 | Asaka | |
| 2011/0119487 A1 | 5/2011 | Alexander | |
| 2011/0209202 A1* | 8/2011 | Otranen | H04L 63/0876 |
| | | | 726/8 |
| 2011/0213829 A1 | 9/2011 | Concini | |
| 2011/0307490 A1 | 12/2011 | Chow | |
| 2011/0307710 A1 | 12/2011 | Mcguire | |
| 2012/0023544 A1 | 1/2012 | Li | |
| 2012/0066363 A1 | 3/2012 | Somogyi | |
| 2012/0066769 A1 | 3/2012 | Latchem | |
| 2012/0239191 A1 | 9/2012 | Versteeg | |
| 2012/0259782 A1 | 10/2012 | Hammad | |
| 2012/0331283 A1 | 12/2012 | Chandran | |
| 2013/0007880 A1 | 1/2013 | Bosco | |
| 2013/0067023 A1 | 3/2013 | Joy | |
| 2013/0111220 A1 | 5/2013 | Friedlander | |
| 2013/0132677 A1 | 5/2013 | Iorio | |
| 2013/0159169 A1 | 6/2013 | Schneeman | |
| 2013/0198851 A1 | 8/2013 | Spies | |
| 2013/0212666 A1 | 8/2013 | Mattsson | |
| 2013/0305392 A1* | 11/2013 | Bar-El | H04L 9/3226 |
| | | | 726/29 |
| 2013/0318348 A1* | 11/2013 | Lebron | H04L 63/0428 |
| | | | 713/168 |
| 2014/0013452 A1 | 1/2014 | Aissi | |
| 2014/0025959 A1 | 1/2014 | Dittrich | |
| 2014/0047551 A1 | 2/2014 | Nagasundaram | |
| 2014/0053244 A1 | 2/2014 | Raman | |
| 2014/0068706 A1 | 3/2014 | Aissi | |
| 2014/0122714 A1 | 5/2014 | Jung | |
| 2014/0150060 A1 | 5/2014 | Riley | |
| 2014/0164381 A1 | 6/2014 | Sutton | |
| 2014/0188734 A1 | 7/2014 | Neuwirth | |
| 2014/0237553 A1 | 8/2014 | Feuer | |
| 2014/0245389 A1 | 8/2014 | Oberheide | |
| 2014/0280260 A1 | 9/2014 | Boukobza | |
| 2014/0281491 A1 | 9/2014 | Zaverucha | |
| 2014/0298030 A1 | 10/2014 | Akiyama | |
| 2014/0310183 A1 | 10/2014 | Weber | |
| 2014/0337974 A1 | 11/2014 | Joshi | |
| 2014/0351573 A1 | 11/2014 | Martini | |
| 2014/0351910 A1 | 11/2014 | Tenenboym | |
| 2014/0380054 A1 | 12/2014 | Roth | |
| 2014/0380404 A1 | 12/2014 | Raj | |
| 2015/0032855 A1 | 1/2015 | Wang | |
| 2015/0033340 A1 | 1/2015 | Giokas | |
| 2015/0058622 A1 | 2/2015 | Sturgill | |
| 2015/0058931 A1 | 2/2015 | Miu | |
| 2015/0058950 A1* | 2/2015 | Miu | G06F 21/31 |
| | | | 726/7 |
| 2015/0074774 A1* | 3/2015 | Nema | H04L 63/062 |
| | | | 726/5 |
| 2015/0089620 A1* | 3/2015 | Manza | H04L 63/10 |
| | | | 726/8 |
| 2015/0135293 A1 | 5/2015 | Mookiah | |
| 2015/0156183 A1 | 6/2015 | Beyer | |
| 2015/0186674 A1 | 7/2015 | Vyas | |
| 2015/0193279 A1 | 7/2015 | Lacivita | |
| 2015/0215267 A1 | 7/2015 | Kagan | |
| 2015/0222615 A1* | 8/2015 | Allain | H04L 67/55 |
| | | | 726/4 |
| 2015/0237027 A1 | 8/2015 | Kim | |
| 2015/0244696 A1 | 8/2015 | Ma | |
| 2015/0244699 A1* | 8/2015 | Hessler | H04W 12/062 |
| | | | 726/7 |
| 2015/0278534 A1 | 10/2015 | Thiyagarajan | |
| 2015/0304298 A1 | 10/2015 | Kreiner | |
| 2015/0312246 A1 | 10/2015 | Mattsson | |
| 2015/0350228 A1 | 12/2015 | Baxley | |
| 2015/0365283 A1 | 12/2015 | Ronca | |
| 2015/0369832 A1 | 12/2015 | Sacco | |
| 2016/0019396 A1 | 1/2016 | Davis | |
| 2016/0034442 A1 | 2/2016 | Levy | |
| 2016/0044040 A1* | 2/2016 | Caffary, Jr. | H04L 9/30 |
| | | | 726/4 |
| 2016/0057208 A1 | 2/2016 | Parikh | |
| 2016/0057234 A1 | 2/2016 | Parikh | |
| 2016/0063271 A1 | 3/2016 | Bartlett | |
| 2016/0065555 A1 | 3/2016 | Branden | |
| 2016/0070917 A1 | 3/2016 | Rozenberg | |
| 2016/0078446 A1 | 3/2016 | Trostle | |
| 2016/0085971 A1 | 3/2016 | Saxena | |
| 2016/0098484 A1* | 4/2016 | Nguyen | G06F 21/33 |
| | | | 707/770 |
| 2016/0119289 A1 | 4/2016 | Jain | |
| 2016/0132214 A1 | 5/2016 | Koushik | |
| 2016/0134616 A1 | 5/2016 | Koushik | |
| 2016/0171236 A1 | 6/2016 | Konik | |
| 2016/0196446 A1 | 7/2016 | Allen | |
| 2016/0219060 A1 | 7/2016 | Karunakaran | |
| 2016/0255137 A1 | 9/2016 | Bleau | |
| 2016/0259936 A1* | 9/2016 | Mukherjee | H04L 63/061 |
| 2016/0261621 A1 | 9/2016 | Srivastava | |
| 2016/0321277 A1 | 11/2016 | Costabello | |
| 2016/0335151 A1 | 11/2016 | Swierk | |
| 2016/0337400 A1 | 11/2016 | Gupta | |
| 2016/0364722 A1 | 12/2016 | Nair | |
| 2016/0366113 A1 | 12/2016 | Dawoud | |
| 2017/0017959 A1 | 1/2017 | Keresman, III | |
| 2017/0019410 A1* | 1/2017 | Reilly | H04L 9/3213 |
| 2017/0046143 A1 | 2/2017 | Kochhar | |
| 2017/0063793 A1 | 3/2017 | Galbreath | |
| 2017/0068960 A1 | 3/2017 | Kwak | |
| 2017/0093916 A1 | 3/2017 | Arumugam | |
| 2017/0104756 A1 | 4/2017 | Rosenthal | |
| 2017/0116436 A1 | 4/2017 | Wu | |
| 2017/0118223 A1 | 4/2017 | Mathew | |
| 2017/0118268 A1 | 4/2017 | Wu | |
| 2017/0132431 A1 | 5/2017 | Gonzalez Blanco | |
| 2017/0155641 A1 | 6/2017 | Fan | |
| 2017/0171170 A1 | 6/2017 | Sun | |
| 2017/0171246 A1 | 6/2017 | Arumugam | |
| 2017/0187690 A1 | 6/2017 | Lancioni | |
| 2017/0195457 A1 | 7/2017 | Smith, II | |
| 2017/0201495 A1 | 7/2017 | Cooley | |
| 2017/0208079 A1 | 7/2017 | Cammarota | |
| 2017/0214759 A1 | 7/2017 | Timiskov | |
| 2017/0230352 A1 | 8/2017 | Chen | |
| 2017/0235936 A1 | 8/2017 | De Los Rios | |
| 2017/0242784 A1 | 8/2017 | Heorhiadi | |
| 2017/0250979 A1 | 8/2017 | Benson | |
| 2017/0289134 A1 | 10/2017 | Bradley | |
| 2017/0289292 A1 | 10/2017 | Arning | |
| 2017/0374070 A1 | 12/2017 | Shah | |
| 2018/0007059 A1* | 1/2018 | Innes | G06F 21/6218 |
| 2018/0027006 A1 | 1/2018 | Zimmermann | |
| 2018/0047014 A1 | 2/2018 | Maus | |
| 2018/0048464 A1 | 2/2018 | Lim | |
| 2018/0060612 A1 | 3/2018 | Gladwin | |
| 2018/0060861 A1 | 3/2018 | Schoultz | |
| 2018/0062832 A1 | 3/2018 | Hatcher | |
| 2018/0077568 A1 | 3/2018 | Young | |
| 2018/0089454 A1 | 3/2018 | Iyer | |
| 2018/0097789 A1 | 4/2018 | Murthy | |
| 2018/0115625 A1 | 4/2018 | Livneh | |
| 2018/0124001 A1 | 5/2018 | Onusko | |
| 2018/0176212 A1 | 6/2018 | Nair | |
| 2018/0189502 A1 | 7/2018 | Kumar | |
| 2018/0205552 A1 | 7/2018 | Struttmann | |
| 2018/0218173 A1 | 8/2018 | Perkins | |
| 2018/0219890 A1 | 8/2018 | Rehak | |
| 2018/0232528 A1 | 8/2018 | Williamson | |
| 2018/0276223 A1 | 9/2018 | Dhanasekaran | |
| 2018/0285591 A1 | 10/2018 | Thayer | |
| 2018/0307857 A1 | 10/2018 | Beecham | |
| 2018/0331885 A1 | 11/2018 | Raymond | |

(56)                References Cited

U.S. PATENT DOCUMENTS

| | | |
|---|---|---|
| 2018/0359256 A1 | 12/2018 | Luzader |
| 2019/0020646 A1* | 1/2019 | Magyar .................... G06F 21/41 |
| 2019/0026332 A1 | 1/2019 | Ahmed |
| 2019/0028462 A1* | 1/2019 | Ishikawa ............... H04L 63/102 |
| 2019/0044925 A1 | 2/2019 | Hawkins |
| 2019/0068406 A1 | 2/2019 | Eperiesi-Beck |
| 2019/0068706 A1 | 2/2019 | Chen |
| 2019/0089711 A1 | 3/2019 | Faulkner |
| 2019/0102437 A1 | 4/2019 | Patthak |
| 2019/0121959 A1 | 4/2019 | Woodworth, Jr. |
| 2019/0180053 A1 | 6/2019 | Angara |
| 2019/0190890 A1 | 6/2019 | Druker |
| 2019/0207754 A1 | 7/2019 | Iyer |
| 2019/0236284 A1 | 8/2019 | Hersans |
| 2019/0238559 A1 | 8/2019 | Paradis |
| 2019/0261169 A1 | 8/2019 | Ashfaq |
| 2019/0273746 A1 | 9/2019 | Coffing |
| 2019/0286813 A1 | 9/2019 | Lounsberry |
| 2019/0287672 A1 | 9/2019 | Molina |
| 2019/0288995 A1 | 9/2019 | Bose |
| 2019/0334779 A1 | 10/2019 | Woodward |
| 2019/0342088 A1 | 11/2019 | Eidson |
| 2019/0349360 A1 | 11/2019 | Yeddula |
| 2019/0356693 A1 | 11/2019 | Cahana |
| 2019/0385159 A1 | 12/2019 | Beatty |
| 2019/0386827 A1 | 12/2019 | Stanley |
| 2020/0012817 A1 | 1/2020 | Damick |
| 2020/0021428 A1 | 1/2020 | Balabine |
| 2020/0021574 A1 | 1/2020 | Pinner |
| 2020/0036788 A1 | 1/2020 | Zhang |
| 2020/0082121 A1 | 3/2020 | Hanafee |
| 2020/0084219 A1 | 3/2020 | Sung |
| 2020/0089680 A1 | 3/2020 | Mital |
| 2020/0089912 A1 | 3/2020 | Mital |
| 2020/0092288 A1 | 3/2020 | Mital |
| 2020/0092289 A1 | 3/2020 | Mital |
| 2020/0092314 A1 | 3/2020 | Mital |
| 2020/0120120 A1 | 4/2020 | Cybulski |
| 2020/0125533 A1 | 4/2020 | Gladkikh |
| 2020/0160388 A1 | 5/2020 | Sabeg |
| 2020/0186534 A1 | 6/2020 | Chanda |
| 2020/0205114 A1 | 6/2020 | Elcock |
| 2020/0226576 A1 | 7/2020 | Mcmahon |
| 2020/0250664 A1 | 8/2020 | Kumar |
| 2020/0334376 A1 | 10/2020 | Bragdon |
| 2020/0336551 A1 | 10/2020 | Knox |
| 2021/0004373 A1 | 1/2021 | Sankaran |
| 2021/0042262 A1 | 2/2021 | Nair |
| 2021/0134406 A1 | 5/2021 | Manuel |
| 2021/0167962 A1 | 6/2021 | Wang |
| 2021/0211468 A1 | 7/2021 | Griffin |
| 2021/0374743 A1* | 12/2021 | Kohli ................... G06Q 20/405 |
| 2021/0409487 A1 | 12/2021 | Pi |

FOREIGN PATENT DOCUMENTS

| | | | | |
|---|---|---|---|---|
| CN | 102638454 A | * | 8/2012 | |
| CN | 103354930 A | * | 10/2013 | ......... H04L 63/0815 |
| CN | 105659558 | | 6/2016 | |
| CN | 108737436 A | * | 11/2018 | ......... H04L 63/0823 |
| CN | 110651458 | | 1/2020 | |
| CN | 110651458 A | * | 1/2020 | ......... H04L 63/0807 |
| CN | 107070848 | | 3/2021 | |
| EP | 3840333 | | 6/2021 | |
| ES | 2281228 | | 9/2007 | |
| FR | 2987529 | | 8/2013 | |
| FR | 2987529 A1 | * | 8/2013 | ............. G06F 21/32 |
| GB | 2541040 | | 2/2017 | |
| WO | WO-2012047718 A1 | * | 4/2012 | ............... G06F 8/24 |
| WO | WO-2015061787 A2 | * | 4/2015 | ........... H04L 67/025 |
| WO | 2018063583 | | 4/2018 | |

OTHER PUBLICATIONS

Citrix Systems Inc: 'NetScaler 12.0 Release Notes Documentation—AppFlow', May 29, 2015, pp. 1503-1519, Retrieved from the Internet: URL: https://docs.citrix.com/en-us/netscaler/downloads/citrix-netscaler-12-0.pdf [retrieved on Feb. 5, 2020].

Citrix Systems Inc: 'NetScaler 12.0 Release Notes Documentation—Application Switching and Traffic Management Features', Aug. 26, 2016, pp. 99-105, Retrieved from the Internet: URL: https://docs.citrix.com/en-us/netscaler/downloads/citrix-netscaler-12-0.pdf [retrieved on Feb. 5, 2020].

Citrix Systems Inc: 'NetScaler 12.0 Release Notes Documentation—Getting Started with Citrix NetScaler', Jul. 5, 2017, pp. 14-25, Retrieved from the Internet: URL: https://docs.citrix.com/en-us/netscaler/downloads/citrix-netscaler-12-0.pdf [retrieved on Feb. 5, 2020].

Citrix Systems Inc: 'NetScaler 12.0 Release Notes Documentation—How AAA Works', Oct. 21, 2015, pp. 805-807, Retrieved from the Internet: URL: https://docs.citrix. com/en-us/netscaler/downloads/citrix-netscaler-12-0.pdf [retrieved on Feb. 5, 2020].

Martin et al., Finding Application Errors and Security Flaws Using PQL: A Program Query Language, OOPSLA '05, Oct. 16-20, 2005, pp. 365-383.

Rath et al., "Adaptive Risk-Aware Access Control Model for Internet of Things," 2017 International Workshop on Secure Internet of Things (SIoT) Year: 20171 Conference Paper I Publisher: IEEE.

Zhang et al., "Webshell Traffic Detection With Character-Level Features Based on Deep Learning," IEEE Access Year: 2018 I vol. 6 I Journal Article I Publisher: IEEE.

* cited by examiner

100

200

300

<u>400</u>

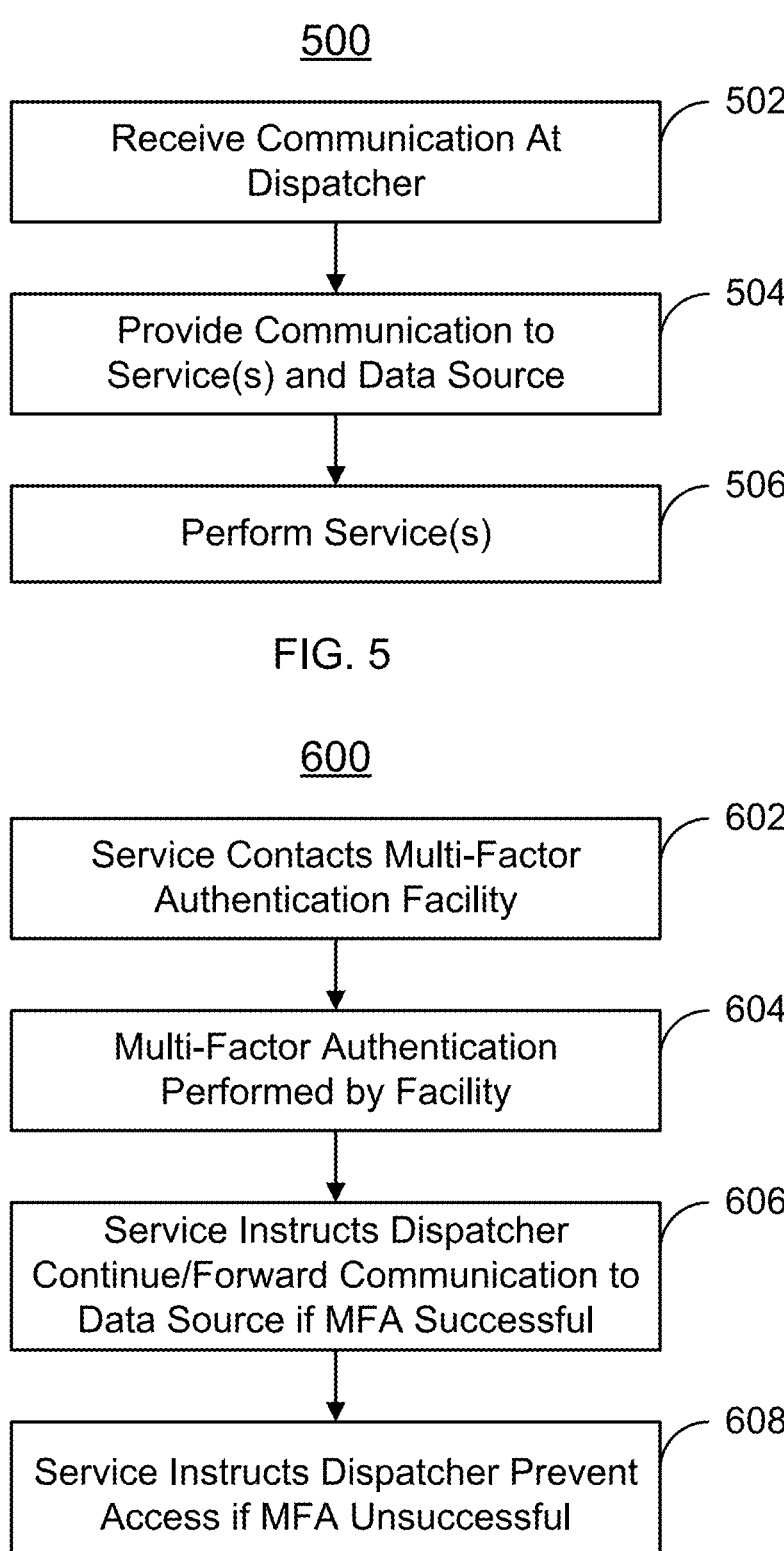

500

Receive Communication At Dispatcher — 502

Provide Communication to Service(s) and Data Source — 504

Perform Service(s) — 506

Service Contacts Multi-Factor Authentication Facility — 602

Multi-Factor Authentication Performed by Facility — 604

Service Instructs Dispatcher Continue/Forward Communication to Data Source if MFA Successful — 606

Service Instructs Dispatcher Prevent Access if MFA Unsuccessful — 608

Service Receives End User Credentials — 702

Service Authenticates User with Federated Identity Management DB — 704

Service Searches DB for End User's Group(s) — 706

Wrapper Logs into Data Source as a Proxy for End User in Group — 708

<u>800</u>

Service Binds to Directory Using Read Only Account — 802

Search for End User in Directory — 804

Bind to Directory as End User if in Directory — 806

Search for End User's Group(s) — 808

Select Group to Access Data Source — 810

Log Into Data Source Using Group — 812

Store Information Re: End User's Data Source Usage — 814

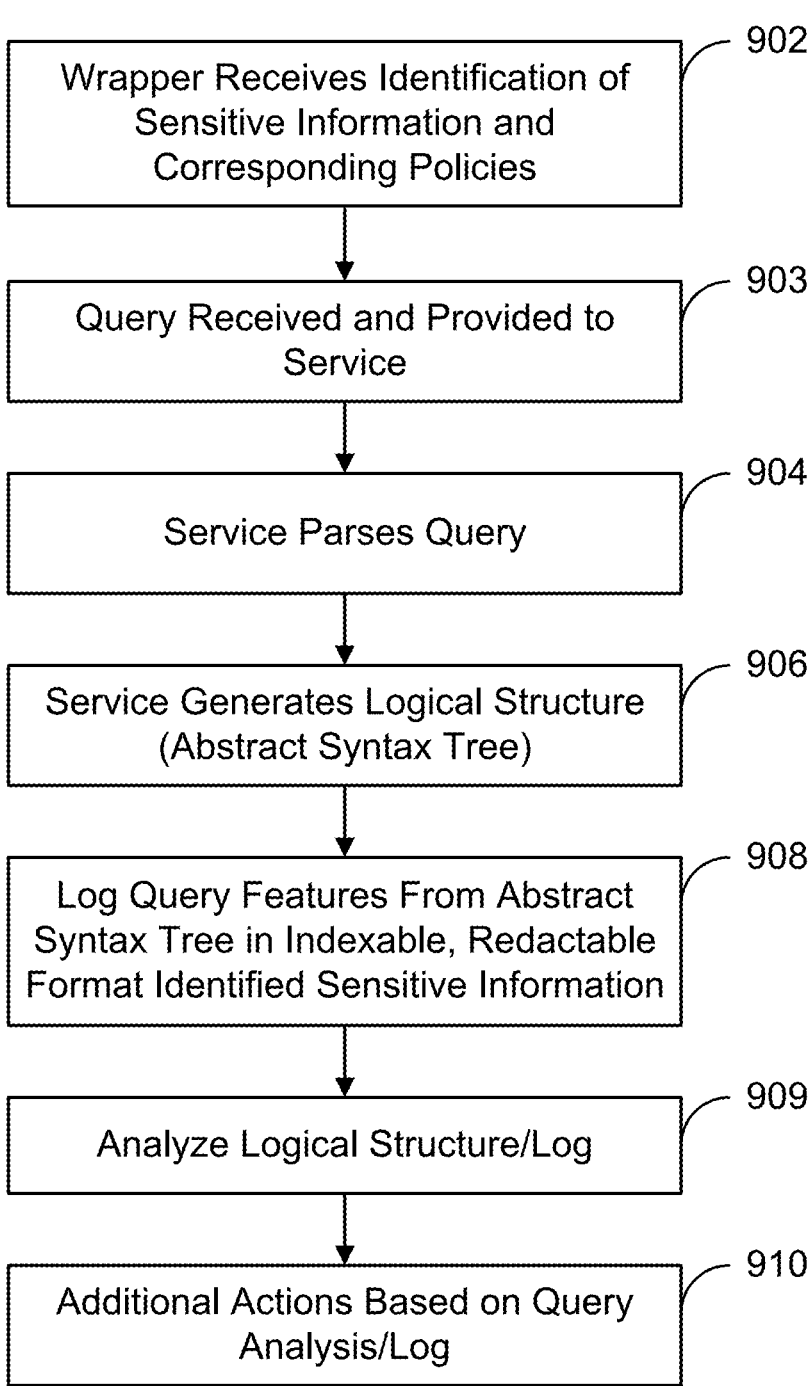

900

902
Wrapper Receives Identification of Sensitive Information and Corresponding Policies 903
Query Received and Provided to Service 904
Service Parses Query 906
Service Generates Logical Structure (Abstract Syntax Tree)

908
Log Query Features From Abstract Syntax Tree in Indexable, Redactable Format Identified Sensitive Information 909
Analyze Logical Structure/Log 910
Additional Actions Based on Query Analysis/Log

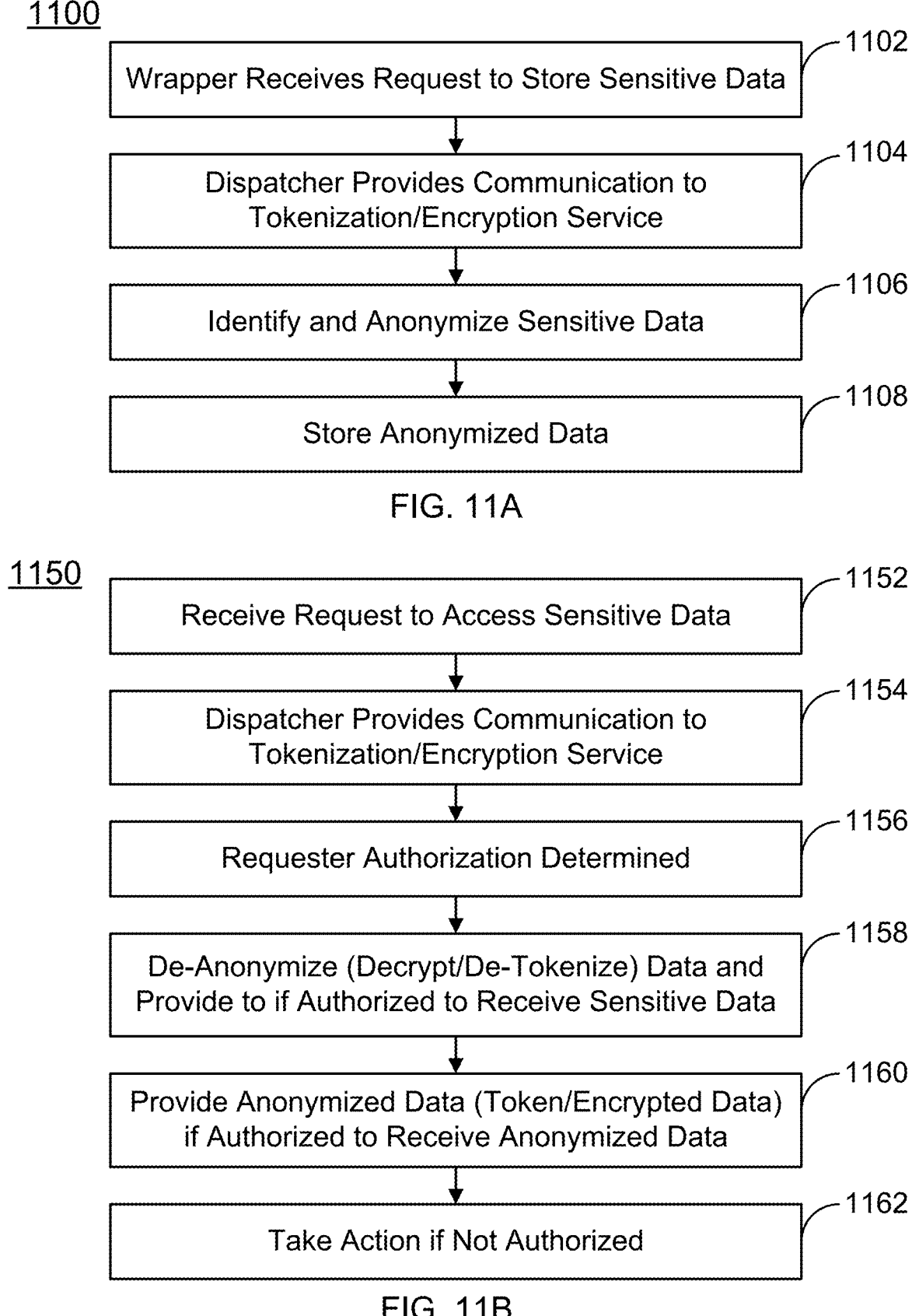

1100

Wrapper Receives Request to Store Sensitive Data — 1102

Dispatcher Provides Communication to Tokenization/Encryption Service — 1104

Identify and Anonymize Sensitive Data — 1106

Store Anonymized Data — 1108

Receive Request to Access Sensitive Data — 1152

Dispatcher Provides Communication to Tokenization/Encryption Service — 1154

Requester Authorization Determined — 1156

De-Anonymize (Decrypt/De-Tokenize) Data and Provide to if Authorized to Receive Sensitive Data — 1158

Provide Anonymized Data (Token/Encrypted Data) if Authorized to Receive Anonymized Data — 1160

Take Action if Not Authorized — 1162

FIG. 11B

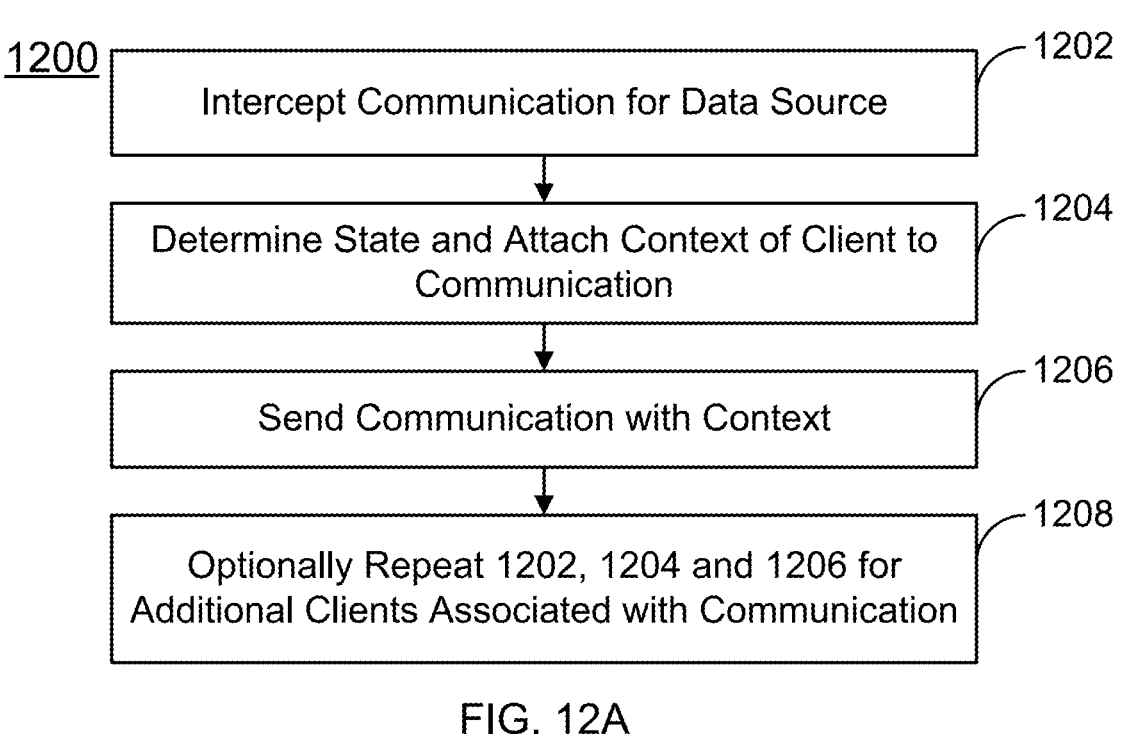

1200

1202 — Intercept Communication for Data Source

1204 — Determine State and Attach Context of Client to Communication

1206 — Send Communication with Context

1208 — Optionally Repeat 1202, 1204 and 1206 for Additional Clients Associated with Communication

1252 — Receive Communication with Context(s)

1254 — Pass Communication with Context(s) to Service(s)

1256 — Compare Context With Baseline/Model

1258 — Allow Access if Authenticated Using Baseline

1260 — Take Action if Not Authenticated

1262 — Update Baseline/Model

FIG. 12B

FEDERATED IDENTITY MANAGEMENT FOR DATA REPOSITORIES

CROSS REFERENCE TO OTHER APPLICATIONS

This application is a continuation of U.S. patent application Ser. No. 17/496,314, entitled FEDERATED IDENTITY MANAGEMENT FOR DATA REPOSITORIES filed Oct. 7, 2021 which is incorporated herein by reference for all purposes, which is a continuation of U.S. patent application Ser. No. 16/548,742 entitled FEDERATED IDENTITY MANAGEMENT FOR DATA REPOSITORIES filed Aug. 22, 2019, now U.S. Pat. No. 11,223,622, which claims priority to U.S. Provisional Patent Application No. 62/733,013 entitled ARCHITECTURE HAVING A PROTECTIVE LAYER AT THE DATA SOURCE, BEHAVIORAL BASELINING FROM DATA SOURCE PERSPECTIVE AND TOKENIZATION SUCH THAT ONLY AUTHORIZED APPLICATIONS CAN USE TOKENS filed Sep. 18, 2018; to U.S. Provisional Patent Application No. 62/758,223 entitled ARCHITECTURE HAVING A DATA SOURCE WRAPPER AND APP AGENT filed Nov. 9, 2018; and to U.S. Provisional Patent Application No. 62/840,847 entitled ARCHITECTURE HAVING A PROTECTIVE LAYER AT THE DATA SOURCE AND THAT PROVIDES QUERY ANALYSIS, FEDERATED IDENTITY MANAGEMENT AND MULTIFACTOR AUTHENTICATION filed on Apr. 30, 2019, all of which are incorporated herein by reference for all purposes.

BACKGROUND OF THE INVENTION

Conventional security models protect data and electronic assets by providing a secure perimeter around an organization. The secure perimeter includes not only the data sources, servers, and other analogous assets, but also clients employed by users of the assets. However, applications remain vulnerable, unscrupulous individuals may still obtain copies of sensitive data and administration of the secure perimeter may be complex and expensive. In addition, data sources, such as conventional databases and modern data repositories including distributed message queues, may not be configured for other types of security, such as tokenization of data and federated identity management. Accordingly, an improved mechanism for providing security for data sources is desired.

BRIEF DESCRIPTION OF THE DRA WINGS

Various embodiments of the invention are disclosed in the following detailed description and the accompanying drawings.

FIG. 5 is a flow chart depicting an exemplary embodiment of a method for performing services for a client for a data source.

FIG. 6 is a flow chart depicting an exemplary embodiment of a method for performing multi-factor authentication for a client for a data source.

FIG. 9 is a flow chart depicting an exemplary embodiment of a method for analyzing and logging information related to queries of a data source.

FIGS. 11A and 11B are flow charts depicting exemplary embodiments of methods for utilizing tokenization and/or encryption of sensitive data.

FIGS. 12A and 12B are flow charts depicting exemplary embodiments of methods for providing client information and for performing behavioral baselining for clients.

DETAILED DESCRIPTION

Figure 1:
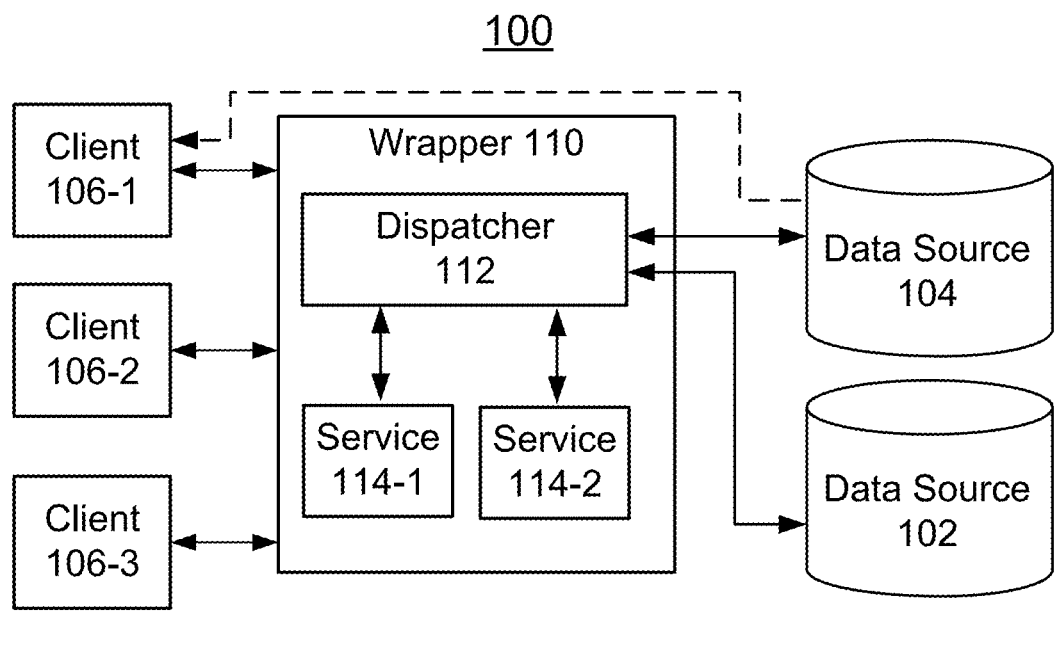
FIG. 1 is an exemplary embodiment of a system including a protective layer at the data source.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The systems and methods described herein provide a protection layer, or wrapper, that resides at and functions as a secure perimeter around a data source. Clients (e.g. applications and/or end users) communicate with and are validated by the wrapper to access the data source. Compromised applications (including previously validated applications) may be denied access to the data source. This approach is in contrast to security measures that place a perimeter around the entire organization including the data source and applications. The methods and systems may also track an application's accesses of the data source to determine a context/behavioral baseline for the application. For example, the type of session, browser, APIs, IP address, query attributes etc. may be used to determine a behavioral baseline for accesses of the data source. Subsequent accesses are compared to the baseline to determine whether a current query matches the baseline. If not, additional validation/defense mechanisms may be employed. Application identity, or application fingerprinting, may be incorporated into this behavioral baselining. In some aspects, data masking may also be employed. In data masking, sensitive data are replaced by tokens or format preserving encryption having a similar form but without intrinsic meaning. For example, credit card or social security numbers may be replaced by a different number having the same number of digits. Tokens may also have an expiration time, requestor identification and other data used to track tokens' use. Tokens are used unless/until the sensitive data are needed (e.g. credit card number needed to process a transaction). If the sensitive data are needed, tokens are presented to the data vault and validated to obtain the sensitive data.

In some embodiments, a wrapper functions as a secure perimeter around a data source. The wrapper includes a dispatcher and a number of services that communicate with the dispatcher. The dispatcher may be a Layer 4 component that intercepts accesses of the data source. Both incoming accesses and outgoing data may be intercepted by the dispatcher. The dispatcher is data agnostic so can be deployed across a variety of data sources. The dispatcher may hold packets (step mode) or immediately forward packets to/from the data source (stream mode) but does not inspect the packets. The dispatcher also provides packets to the services. The services perform deeper inspection of the packets intercepted by the dispatcher. Services may provide one or more functions including but not limited to: authentication of the user/requester of the data source, query analysis, multifactor authentication, tokenization of data, rewriting, caching and behavioral baselining (using collectors), federated identity management and other functionality. In some embodiments, services may include Layer 7 (application layer) components. For example, for authentication, the service may inspect the user's credentials (e.g. user id and password and/or certificate) for that data source and only allow access to the data source if the user's credentials are validated. One or more of these services can be used together. This approach is in contrast to security measures that place a perimeter around the entire organization including the data source and applications or which attempt to manage the data source/organization using Layer 7 components.

In addition to the wrapper at the data source, collectors may be used at some/all of the clients using the data repository/data source. Collectors can be present for some or all clients having applications issuing queries to the data source. For example, collectors can be attached to applications for end users as well as in microservices utilized by end users. A collector intercepts a communication (e.g. a query or method call) from the application and examines the state of the application. For example, the type of session, get/put/post/delete commands, APIs, IP address, query attributes, method calls, order of queries and/or other information may be detected by the collector. These represent the context of the query, or state of the application/client issuing the query. The collectors attach this context to the query. In the case of microservices/multiple applications pass a query before the query is sent to a database. For example, one microservice may issue a query and pass the query to a second microservice. The second microservice may add to the query or issue an additional query. The collector for each microservice/application can obtain the context from that microservice/application. The collector also attaches the context from that microservice/application to the query/queries. Thus, multiple contexts may be obtained from multiple microservices/applications for a single access of a data source. The query and context are passed to the wrapper when the data source is accessed. Over multiple accesses, the context can be used by the wrapper (e.g. a service) to determine the behavior (sequence of states/contexts) for each application's accesses of the data source. A model of the behavior (e.g. a Hidden Markov Model) can provide a behavioral baseline. Subsequent accesses are compared to the behavioral baseline to determine whether a current query matches the behavioral baseline. If not, additional validation/defense mechanisms may be employed. For example, access to the data source can be refused and/or multifactor authentication invoked. Collectors and/or behavioral baselining may be used in conjunction with other services.

Requests regarding sensitive data can be sent to a tokenization/encryption service by the dispatcher. The service replaces sensitive data with tokens/format preserving encryption (FPE), or analogous data that is without intrinsic meaning. What is used (tokens or FPE) is configurable on the attribute level. For example, for credit card numbers of a user, FPE can be used. For the social security number of the same user, a token can be used. In some embodiments, the request to store sensitive information can be provided to the service and the value encrypted before storage in the data store. A request to obtain the number can be provided to the service which can decrypt/detokenize if the requester is authorized. Alternatively, the token/FPE can be provided in response to the request. Tokens/FPE can have an expiration time, requestor identification or other information. Tokens are used unless/until the sensitive data are needed (such as a credit card number needed to process a transaction). If the sensitive data are needed, tokens are presented to the data vault and validated to obtain the sensitive data. This validation may require additional, more trusted mechanisms for ensuring the security of the sensitive data. Tokenization can be used in conjunction with behavioral baseline/collectors, multifactor authentication and/or other services.

Multifactor authentication may also be performed using a service. In some embodiments, the dispatcher is placed in step mode, to hold packets instead of directly forwarding to a data source. The dispatcher also provides packets to the service, which controls multi-factor authentication. The service performs multifactor authentication (e.g. requiring a code to be sent to a separate device and input) or accesses a third party multifactor authentication service. Once multifactor authentication is completed, the dispatcher is placed in stream mode, allowing the user to communicate with the data source. Thus, the data agnostic dispatcher can provide multifactor authentication across a number of different data sources, such as databases that do not traditionally support multifactor authentication.

The dispatcher can forward requests/queries to an analyzer service that performs query analysis. The analyzer service examines/parses the queries and emits a structure that describes the query. In some embodiments, the structure is an abstract syntax tree. However, other structures may be used. The structure can be used to determine whether the query represents an attack, (e.g. to obtain unauthorized information) to determine whether the query will adversely affect performance. For example, queries which include wildcards or tautologies in users' names can result in exfiltration of sensitive information. Queries that are missing a where clause can adversely affects database performance. Such queries may be identified. The packet including the query can then be stopped or the query can be canceled. Further, the structure emitted by the query analyzer may be used to log or otherwise store information about the queries. For example, the structure may be used to identify and log features of the query that may be of interest. Such information may be used in conjunction with analytics to examine use of the data source. In some embodiments, the information regarding queries that is logged can be indexed and may include only information previously identified as sensitive. For example, the tables, columns in tables, and data entries corresponding to the identified sensitive information may be logged. Further, such information redacted so that certain information, such as names and/or social security numbers, are not included in the log.

Another service provided may include query rewriting, which may be used with query analysis. Queries that may adversely affect performance can be rewritten. For example, a limit may be added so that too many results are not returned, a tautology removed, and/or other portions of the query rewritten to improve performance.

A service can be used for federated identity management (for example via lightweight directory access protocol (LDAP)). An end user requests access to the data repository/database and provides the directory access credentials via the wrapper. The dispatcher provides the request to a service controlling federated identity management. The wrapper/service determines whether the end user exists on a directory access server (e.g. an LDAP server), authenticates the end user's credentials on the directory access server and determines the groups to which the end user belongs. The service uses the group information to access the data repository as a proxy for the end user.

A method and system for performing at least one service are disclosed. The method and system include receiving a communication for a data source at a wrapper. The wrapper includes a dispatcher and at least one service. The dispatcher receives the communication and is data agnostic. The method and system also include providing the communication from the dispatcher to the data source and to the at least one service. The at least one service inspects the communication and may perform additional functions. In some embodiments, the dispatcher is an open systems interconnection (OSI) Layer 4 dispatcher and the service(s) include OSI Layer 7 service(s). In some embodiments, the method and system also include performing at least one function by the at least one service based on the communication. The at least one function may include one or more of authentication services, multifactor authentication, tokenization of data, encryption of data, query analysis, behavioral baselining, and federated identity management. For example, the communication may be generated at a client and service(s) may include an authentication service. In such embodiments, the method and system further include determining whether the client is authorized to access the data source using the authentication service and preventing access to the data source if the client is not authorized to access the data source. For example, the communication may be provided to the data source only if the authentication service determines the client is authorized to access the data source. In some embodiments, the communication to the data source from the dispatcher and recalled before processing by the data source if the authentication service determines the client is not authorized to access the data source. In some embodiments, the communication is generated at a client and includes a first communication. The service(s) include an authentication service the dispatcher is in a step mode for the first communication from the client. In such embodiments the first communication may be provided to the authentication service without forwarding the first communication to the data source (step mode). The authentication service may use the first communication to determine whether the client is authorized to access the data source. If it is determined that the client is not authorized to access the data source, access to the data source by the client may be prevented by terminating a connection to the client. If it is determined that the client is authorized, then the first communication is provided from the dispatcher to the data source. The dispatcher is also placed in a stream mode. Upon receiving additional communication(s) from the client, the dispatcher, automatically forwards the at least one additional communication from the dispatcher to the data source.

A method and system that may utilize behavioral baselining are disclosed. The method and system include receiving, at the wrapper, a communication and a context associated with the communication from a client. The communication is for a data source. The wrapper includes the dispatcher and the service. The method and system also include providing the context from the dispatcher to the service. In some embodiments, the method and system use the service to compare the context to a behavioral baseline for the client. The behavioral baseline incorporates a plurality of contexts previously received from the client. The method and system also permit the client access the data source only if the context is consistent with the behavioral baseline. The behavioral baseline may also be updated based on the context. In some embodiments, the communication is intercepted at the client using a collector. The collector determines the context of the client and attaches the context to the communication. In some embodiments, the method and system include receiving, at the dispatcher and from the client, additional communication(s) and additional context(s) associated with the additional communication(s). The additional communication(s) are for the data source. The additional context(s) are provided from the dispatcher to the service. The service compares the context and additional context(s) to the behavioral baseline for the client. In some embodiments, the client is allowed to access the data source only if the context and the additional context(s) are consistent with the behavioral baseline. In some embodiments, the method and system also include receiving additional context(s) associated with the communication from additional client(s). The additional context(s) are also provided from the dispatcher to the service. In such embodiments, the service compares the context and the additional context(s) to the behavioral baseline for the client.

A method and system for anonymizing data are disclosed. The method and system include receiving, at the wrapper, a request to store data in a data source. The method and system also include providing the request from the dispatcher to the at least one service and anonymizing, at the service(s), the data to provide anonymized data. The anonymized data may be provided to the data source. In some embodiments, the request includes the data and additional data. In such embodiments, the anonymizing further includes identifying the data to be anonymized. The anonymizing may include tokenizing and/or encrypting the data. The tokenizing and/or encrypting may be selected based upon a policy for the data. In some embodiments, the encryption uses format preserving encryption. In some embodiments, the method and system further include receiving, from a requester, an access request for the data. The requester is authenticated. If the requester is authorized to receive the data, the method and system include de-anonymizing the anonymized data and providing de-anonymized data to the requester. If the requester is authorized to receive the anonymized data, the method and system include providing the anonymized data.

A method and system for performing authentication are described. The method and system include receiving, from a client, a communication for a data source at the wrapper. The communication is provided from the dispatcher to the service. The service determines whether the client is authorized to access the data source. In some embodiments, the service determines whether the client is authorized by calling a multi-factor authentication (MFA) utility. The method and system also include receiving, from the MFA utility, a success indication. The success indication indicates whether authentication by the MFA utility is successful. In some embodiments, the MFA utility is a third-party MFA utility. The method and system may also include preventing access to the data source if the success indication indicates that the authentication is unsuccessful. Preventing access may include providing the communication to the data source from the dispatcher and recalling the communication before processing by the data source if the authentication indication indicates the authentication is unsuccessful. In some embodiments, the communication includes a first communication and the dispatcher is in a step mode for the first communication. In such embodiment, the preventing access may include providing the first communication to the service without forwarding the first communication to the data source. Preventing access to the data source may include terminating a connection to the client if the success indication indicates that the authentication is unsuccessful. In addition, the first communication may be forwarded from the dispatcher to the data source if the success indication indicates that the authentication is successful. The dispatcher may be placed in a stream mode if the success indication indicates that the authentication is successful. At least one additional communication from the client may be received at the dispatcher. Such additional communications are automatically forwarded from the dispatcher to the data source if the success indication indicates that the authentication is successful. In some embodiments, the dispatcher is an open systems interconnection (OSI) Layer 4 dispatcher and wherein the at least one service includes at least one OSI Layer 7 service.

A method and system for performing query analysis are described. The method and system include receiving a query for a data source at the wrapper. The method and system also include providing the query from the dispatcher to the data source and to the service. The query is analyzed using the service. In some embodiments, analyzing the query further includes parsing the query, providing a logical structure based on the query and analyzing the logical structure. In some embodiments, a log is provided based on the logical structure. The log may also be analyzed. The method and system may include receiving at least one of an identification of sensitive data and sensitive data policies. In some such embodiments, providing the log further includes redacting a portion of the log based on the sensitive data policies and the identification of the sensitive data. The method and system may prevent access to the data source if the analysis of the query indicates the query is an attack. In some embodiments, the method and system rewrite the query if the analysis of the query indicates the query adversely affects performance. In some embodiments, the analysis of the query indicates that data for a response to the query is in a cache. In such embodiments, the method and system may provide the data from the cache.

A method and system for performing federated identity management are described. The method and system include receiving a communication for a data source at a wrapper. The wrapper includes a dispatcher and a service. The dispatcher receives the communication and is data agnostic. The communication corresponds to end user credentials for an end user. The method and system include providing the communication from the dispatcher to the data source and to the service. The method and system also use the service to authenticate the end user based on the end user credentials and utilizing federated identity management. In some embodiments, the method and system also include accessing the data source by the wrapper as a proxy for the end user if the end user is authenticated using the federated identity management. The end user activities for the data source may also be logged. In some embodiments, authenticating the end user includes providing the end user credentials to a federated identity management data source. The federated identity management data source may be searched for group(s) to which the end user belongs. In some embodiments, a read only binding of the service to the federated identity management data source is performed. In such embodiments, the federated identity management data source may be searched for the end user using the read only binding. If the end user is authenticated, the method and system may include binding the service to the federated identity management data source as a proxy for the end user. Access to the data source may be prevented if the end user is not authenticated utilizing the federated identity management.

FIG. 1 is a diagram depicting an exemplary embodiment of a system 100 utilizing a protective layer between clients and data sources. System 100 includes data sources 102 and 104, clients 106-1, 106-2 and 106-3 (collectively clients 106) and wrapper 110. Although two data sources 102 and 104, three clients 106 and one wrapper 110 are shown, in another embodiment, different numbers of data sources, clients, and/or wrappers may be used. Data sources 102 and 104 may be databases, data stores, data vaults or other data repositories. Clients 106 may be computer systems for end users and/or include applications which provide requests, or queries, to data sources 102 and 104. Clients 106 may be part of the same organization as the data sources 102 and 104 or may be outside users of data sources 102 and 104. For example, clients 106 and data sources 102 and 104 may be part of the same business organization coupled by an internal network. In other embodiments, clients 106 may be outside users of data sources 102 and 104 connected to wrapper 110 and/or data sources 102 and/or 104 via the Internet or other external network. In some embodiments, some clients 106 may be external users of data sources 102 and 104 while other clients 106 are part of the same organization as data sources 102 and 104.

Wrapper 110 provides a protective layer between clients 106 and data sources 102 and 104. Wrapper 110 is configured such that its operation is data agnostic. Thus, wrapper 110 may be used with data sources 102 and 104 that have different platforms, are different databases, or are otherwise incompatible. Wrapper 110 is so termed because although depicted as residing between clients 106 and data sources 102 and 104, wrapper 110 may be viewed as enclosing, or forming a secure perimeter around data sources 102 and 104. Stated differently, clients 106 cannot bypass wrapper 110 in order to access data sources 102 and 104 in at least some embodiments. For example, a security group may be created for data sources 102 and 104. Dispatcher 112/wrapper 110 may be the only member of the security group. Thus, clients 106 may access data sources 102 and 104 only through wrapper 110. Clients 106 connecting to wrapper 110 may be internal or external to an organization. Therefore, wrapper 110 need not reside at the perimeter of an organization or network. Instead, wrapper 110 may reside at data sources 102 and 104. Stated differently, wrapper 110 may provide the final or only security for requests for data source 102 and 104 and need not provide security for other components of the organization. Thus, requests made by clients 106 may be passed directly from wrapper 110 to data sources 102 and 104 via a network.

Wrapper 110 provides security and other services for data sources 102 and 104 and clients 106. To do so, wrapper 110 includes dispatcher 112 and services 114-1 and 114-2 (collectively services 114). Dispatcher 112 is data agnostic and in some embodiments is a transport layer component (e.g. a component in Layer 4 of the Open Systems Interconnection (OSI) model). Dispatcher 112 thus performs limited functions and is not a Layer 7 (application layer) component. In particular, dispatcher 112 receives incoming communications from clients 106. As used herein, a communication includes a request, a query such as a SQL query, or other transmission from clients 106 to access data source 102 or 104.

Dispatcher 112 also provides the requests to the appropriate data source(s) 102 and/or 104 and the appropriate service(s) 114-1 and/or 114-2. However, dispatcher 112 does not inspect incoming communications from clients 106 other than to identify the appropriate data source(s) 102 and/or 104 and corresponding service(s) 114 for the communication. Dispatcher 112 does not make decisions as to whether communications are forwarded to a data source or service. For example, a communication from a client 106 may include a header indicating the data source 102 desired to be accessed and a packet including a query. In such a case, dispatcher 112 may inspect the header to identify the data source 102 desired to be accessed and forwards the packet to the appropriate data source 102. Dispatcher 112 also provides the packet to the appropriate service(s) 114. However, dispatcher 112 does not perform deep inspection of the packet. Instead, the appropriate service(s) inspect the packet. In some embodiments, dispatcher 112 provides the communication to the appropriate service(s) 114 by storing the packet and providing to service(s) 114 a pointer to the storage location.

In some embodiments, dispatcher 112 holds communications (e.g. packets) while service(s) 114 perform their functions. In other embodiments, dispatcher 112 directly forwards the communications to data source(s) 102 and/or 104 and services 114 separately perform their functions. In some embodiments, whether dispatcher 112 holds or forwards communications depends upon the mode in which dispatcher 112 operates. For example, in a step mode, dispatcher 112 may store some or all of the communication from client 106-1 without forwarding the communication to data sources 102 and 104. In such a mode, dispatcher 112 only forwards the communication to a data source if instructed to do so by the appropriate service 114 or if placed into stream mode by the appropriate service 114. Although not forwarding the communication to a data source, dispatcher 112 does provide the communication to service 114-1, for example for client 106-1 to be authenticated and/or for other functions. If client 106-1 is authenticated, dispatcher 112 may be placed in stream mode by service 114-1. Consequently, dispatcher 112 forwards the communication to the appropriate data source(s) 102. Because dispatcher 112 is now in stream mode, subsequent communications from client 106-1 may then be forwarded by dispatcher 112 directly to the appropriate data source(s) 102 and/or 104, even if the subsequent communications are also provided to a service 114 for other and/or additional functions. Thus, dispatcher 112 may provide the communication to the data source(s) as received/without waiting for a response from a service 114.

In some embodiments, responses from data source(s) 102 and/or 104 are also inspected by wrapper 110 and provided to clients 106 only if the responses are authorized. As used herein, a response from a data source may include data or other transmission from the data source to the client requesting access. In other embodiments, responses from data source(s) 102 and/or 104 may bypass wrapper 110 and be provided directly to clients 106. This is indicated by the dashed line from data source 104 to client 106-1. In the embodiment shown, therefore, data source 104 may bypass wrapper 110 and provide responses directly to client 106-1.

Services 114 provide security and other functions for data sources 102 and 104 and clients 106. For example, services 114 may include one or more of authentication, query analysis, query rewriting, caching, tokenization and/or encryption of data, caching, advanced or multifactor authentication, federated identity management, and/or other services. Further, one or more of the services described herein may be used together. Services 114 perform more functions than dispatcher 112 and may be application layer (Layer 7) components. In contrast to dispatcher 112, services 114 may perform a deeper inspection of communications from clients 106 in order to provide various functions. The services 114 performing their functions may thus be decoupled from forwarding of communications to data source(s) 102 and/or 104 by dispatcher 112. If a client or communication is determined by a service 114 to be unauthorized or otherwise invalid, the communication may be recalled, or canceled, from data source(s) 102 and/or 104 and connection to the client terminated. The communication may be recalled despite the decoupling of tasks performed by services 114 with forwarding of communications by dispatcher 112 because data sources 102 and 104 typically take significantly more time to perform tasks than services 114. The time taken by data source 102 and 104 may be due to issues such as transmission over a network from wrapper 110 to data sources 102 and 104, queues at data sources 102 and 104, and/or other delays.

In some embodiments, services 114 may perform authentication. For example, suppose service 114-1 validates credentials of clients 106 for data sources 102 and 104. In some such embodiments, service 114-1 may simply employ a username and password combination. In other embodiments, multifactor authentication (MFA), certificates and/or other higher level authorization is provided by one or more services 114. Such authentication is described herein. However, dispatcher 112 may still be a data agnostic component, such as a Layer 4 component.

In some embodiments, this separation of functions performed by dispatcher 112 and services 114 may be facilitated by routines or other lightweight process(s). For example, a client such as client 106-2 may request access to data source 104 via a particular port. Wrapper 110 may utilize listener(s) (not shown in FIG. 1) on the ports to identify requests for data sources 102 and 104. In response to the request for access, a connection to the client 106-2 is established for the wrapper 110 on that port and a routine corresponding to the connection generated. In some embodiments, the routine is responsible for that connection only. The communication from client 106-2 is also provided to dispatcher 112. Dispatcher 112 provides the communication to the appropriate service(s) 114 for authentication, for example via a message bus (not shown in FIG. 1). Dispatcher 112 may hold (in step mode) or forward (in stream mode) the communication to the data source(s) 102 and/or 104. If client 106-2 is not authenticated or is later determined by service(s) 114 to be unauthorized, then the service(s) 114 indicates this to dispatcher 112. For example, service(s) 114 may provide a message to dispatcher 112 via the message bus that client 106-2 is not authorized/that the corresponding routine has an unauthorized connection. Dispatcher 112 communicates with the corresponding routine, which terminates the connection to client 106-2. Thus, connections to clients 106 may be securely managed using data agnostic, Layer 4 dispatcher 112.

Using system 100 and wrapper 110, data sources 102 and 104 may be secured and other features may be provided via service(s) 114. Because of the use of data agnostic dispatcher 112, wrapper 110 may function with a variety of data sources 102 and 104 that do not share a platform or are otherwise incompatible. Deployment of wrapper 110, for example either in the cloud or on premises, does not require changes in existing code. Consequently, implementation of wrapper 110 may be seamless and relatively easy for developers. Further, wrapper 110 need not protect every component within a particular organization. Instead, only selected data sources may be protected. Use of services 114 for security as described herein may be both more effective at securing sensitive data and less expensive because data sources may not significantly increase in number even when the number of applications that access the data sources grows significantly. Further, utilizing services 114, the level of security and/or functions provided by wrapper 110 may differ for different data sources. Additional functionality may also be provided by services 114.

Figure 2:
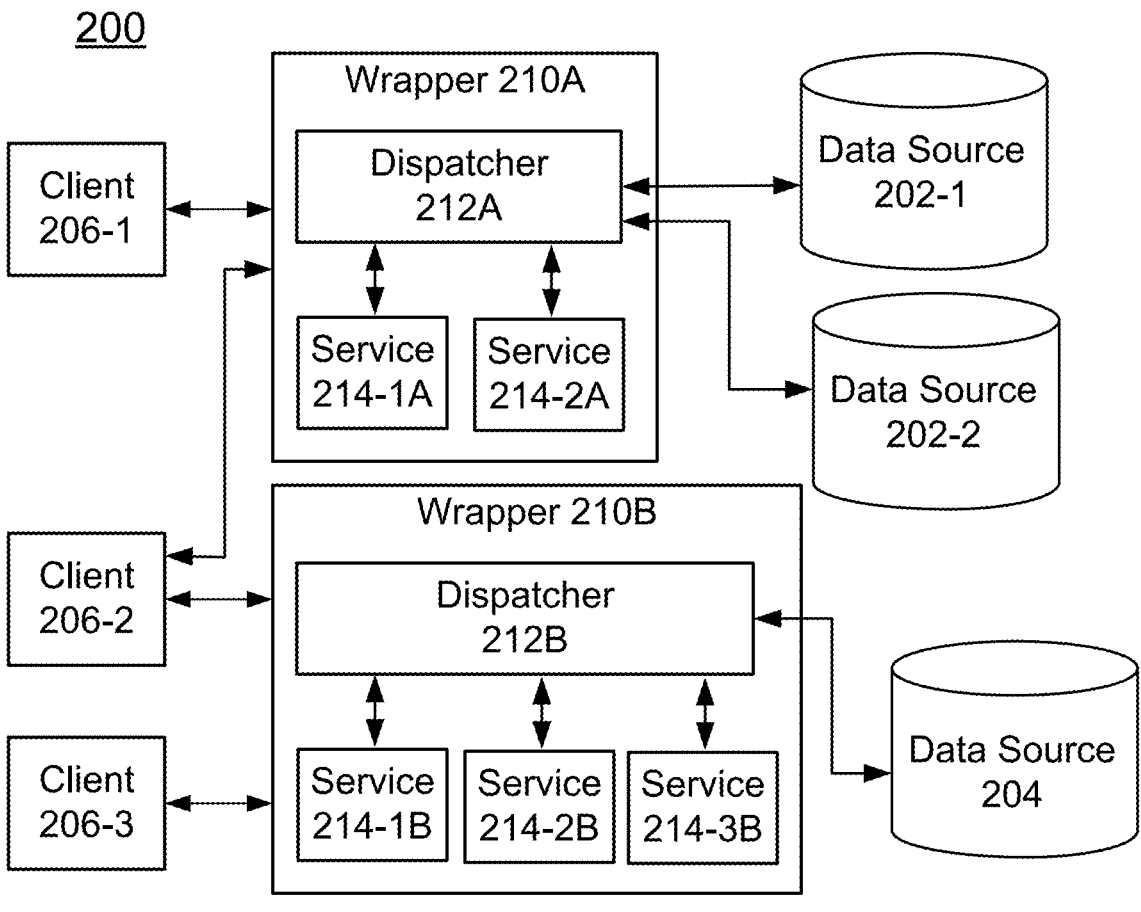
FIG. 2 is another exemplary embodiment of a system including a protective layer at the data source.

FIG. 2 is a diagram depicting another exemplary embodiment of a system 200 utilizing a protective layer between clients and data sources. System 200 is analogous to system 100 and includes components that are labeled similarly. System 200 indicates that multiple wrappers having different services may be used. Thus, system 200 includes data sources 202-1, 202-2 (collectively 202) and 204, clients 206-1, 206-2 and 206-3 (collectively clients 206) and wrappers 210A and 210B (collectively wrappers 210). Although three data sources 202-1, 202-2 and 204, three clients 206 and two wrappers 210 are shown, in another embodiment, different numbers of data sources, clients, and/or wrappers may be used. Data sources 202-1, 202-2 and 204 and clients 206 are analogous to data sources 102 and 104 and clients 106, respectively. Wrappers 210A and 210B are analogous to wrapper 110. Thus, wrapper 210A includes dispatcher 212A and services 214-1A and 214-2A (collectively services 214A). Similarly, wrapper 210B includes dispatcher 212B and services 214-1B, 214-2B and 214-3B (collectively services 214). Services 214A may differ from or be included in services 214B. Wrapper 210A controls accesses to data sources 202, while wrapper 210B controls accesses to data source 204 in a manner analogous to described elsewhere herein. In general, one wrapper having multiple services may function for all the data sources in an organization. However, as depicted in FIG. 2, nothing prevents the use of multiple wrappers. Further, although wrappers 210A and 210B are shown as controlling access to different data sources 202 and 204, in other embodiments, wrappers may control the same data source. For example, in another embodiment, wrapper 210B might serve both data source 202-1 and data source 204.

Figure 3:
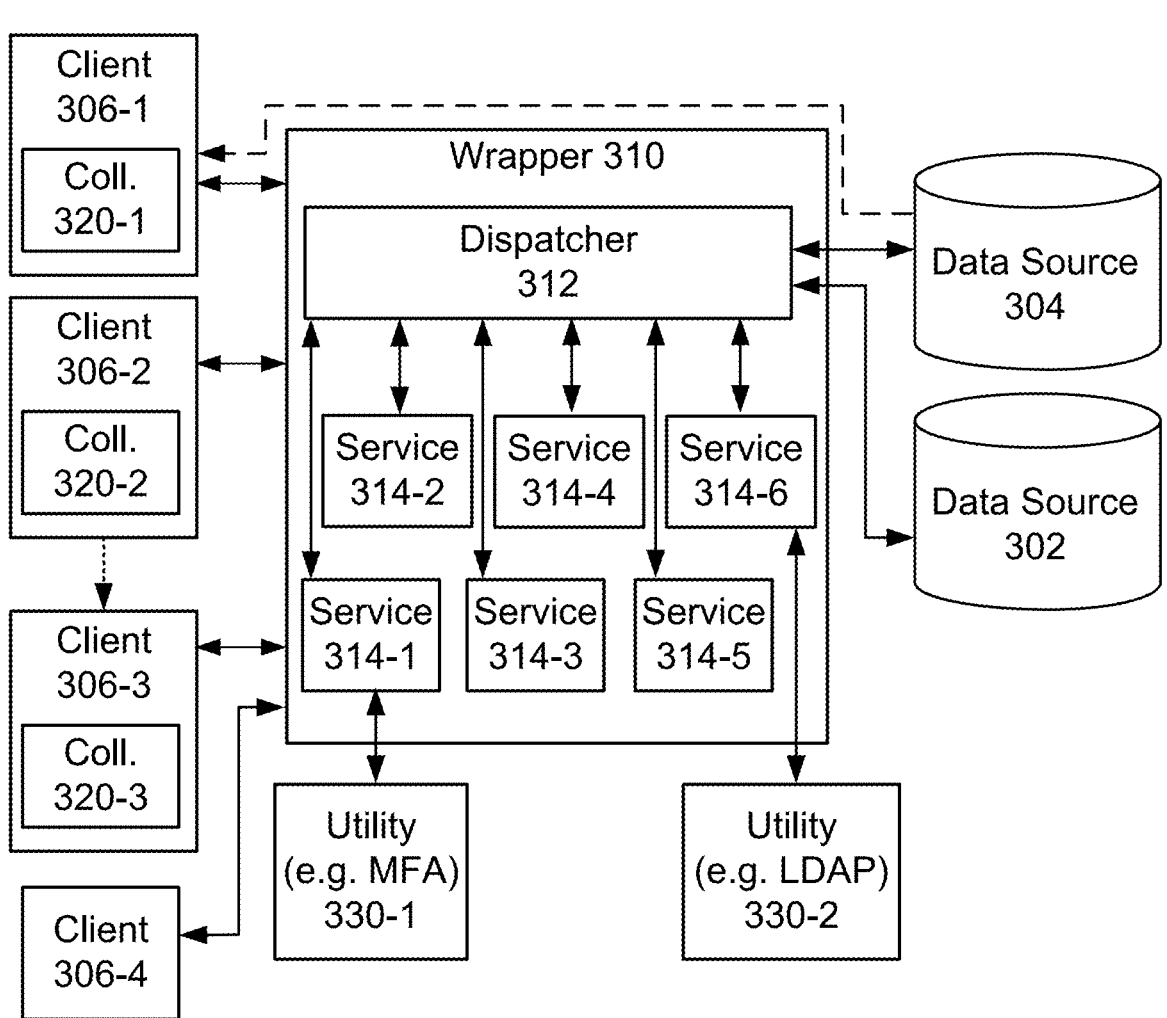
FIG. 3 is another exemplary embodiment of a system including a protective layer at the data source.

FIG. 3 is a diagram depicting another exemplary embodiment of a system 300 utilizing a protective layer between clients and data sources. System 300 is analogous to systems 100 and 200 and includes components that are labeled similarly. System 300 also includes collector 320-1, 320-2 and 320-3 (collectively collectors 320). Thus, system 300 includes data sources 302 and 304, clients 306-1, 306-2 and 306-3 (collectively clients 306) as well as client 306-4 and wrapper 310. Although two data sources 302 and 304, four clients 306 and one wrapper 310 are shown, in another embodiment, different numbers of data sources, clients, and/or wrappers may be used. Data sources 302 and 304 and clients 306 are analogous to data sources 102 and 104 and clients 106, respectively. Wrapper 310 is analogous to wrapper 110. Thus, wrapper 310 includes dispatcher 212 and services 314-1, 314-2, 314-3, 314-4 and 314-5 (collectively services 314). Wrapper 310 controls accesses to data sources 302 and 304. Also shown are utilities 330-1 and 330-2 that might be used by services 314. For example, service 314-1 might perform authentication and multifactor authentication using utility 330-1. Service 314-6 may perform federated identity management using utility 330-2. Other and/or additional utilities may be used in connection with system 300, as well as with system(s) 100 and/or 200. Service 314-2 might perform query analysis as described herein. Service 314-3 might perform behavior modeling based on inputs from collectors 320. Service 314-4 may perform tokenization and/or encryption of sensitive data. Service 314-5 may rewrite queries based on the analysis performed by service 314-2. Alternatively, service 314-2 might also rewrite queries. Thus, service 314-5 might perform another function such as caching. Other services not described herein may also be provided. Two or more services may be used together in some embodiments Collectors 320 reside on some clients 306. In some embodiments, each of the clients 306 includes a collector. In other embodiments, as shown in FIG. 3, not all clients 306 include a collector. In some embodiments, none of clients 306 includes a collector. For example, clients 306 may include end users, applications, and/or microservices utilized by end users. Thus, clients 306 may pass communications to each other prior to the communication being provided to wrapper 310. This is indicated by dotted line between client 306-2 and client 306-3. Collectors 320 intercept communications from clients 306 and append onto the communication a state of the client/application issuing the communication. For example, collector 320-1 may intercept a query or method call from the application on client 306-1 and examine the state of the application. The type of session, get/put/post/delete commands, APIs, IP address, query attributes, method calls, order of queries etc. may be detected by collector 306-1. These represent the context of the query/communication. Collectors 320 attach this context to the query/communication from the corresponding clients 306. In the case of microservices/multiple applications passing a query before the query is sent to a data source, the collectors 320 for each of the microservice/applications 306 may apply the context from that microservice/application. For example, a query passed from client 306-2 to client 306-3 and then to wrapper can include a first context provided by collector 320-2 and a second context provided by collector 320-3. If one or more of clients 306 being passed a query does not include a collector, then that client simply does not attach the context from the client. For example, if a query is passed from client 306-1 to client 306-4, then to client 306-3, a first context from collector 320-1 and a second context from collector 320-3 are attached to the query. In such embodiments, no context is attached by client 306-4 because no collector is present for client 306-4. The query and context(s) are passed to wrapper 310 when data source 302 or 304 is accessed. Over multiple accesses, the contexts can be used by wrapper 310 (e.g. a service such as service 314-3) to determine the behavior (sequence of states/contexts) for each application's accesses of data source(s) 302 and/or 304. A model of the behavior (e.g. using a Hidden Markov Model) can provide a behavioral baseline. Subsequent accesses are compared to the baseline by service 314-3 to determine whether a current query/communication matches the baseline. If not, additional validation/defense mechanisms may be employed. For example, the connection may be terminated as described herein, access to data source 302 and/or 304 may be otherwise denied and/or additional forms of validation such as MFA may be utilized via services 314.

System 300 may provide the benefits of systems 100 and/or 200. In addition, system 300 may improve security via collectors 320. Further, end-to-end visibility, from clients 306 to data sources 302 and 304, may be provided via wrapper 310. Thus, performance of system 300 may be improved.

Figure 4:
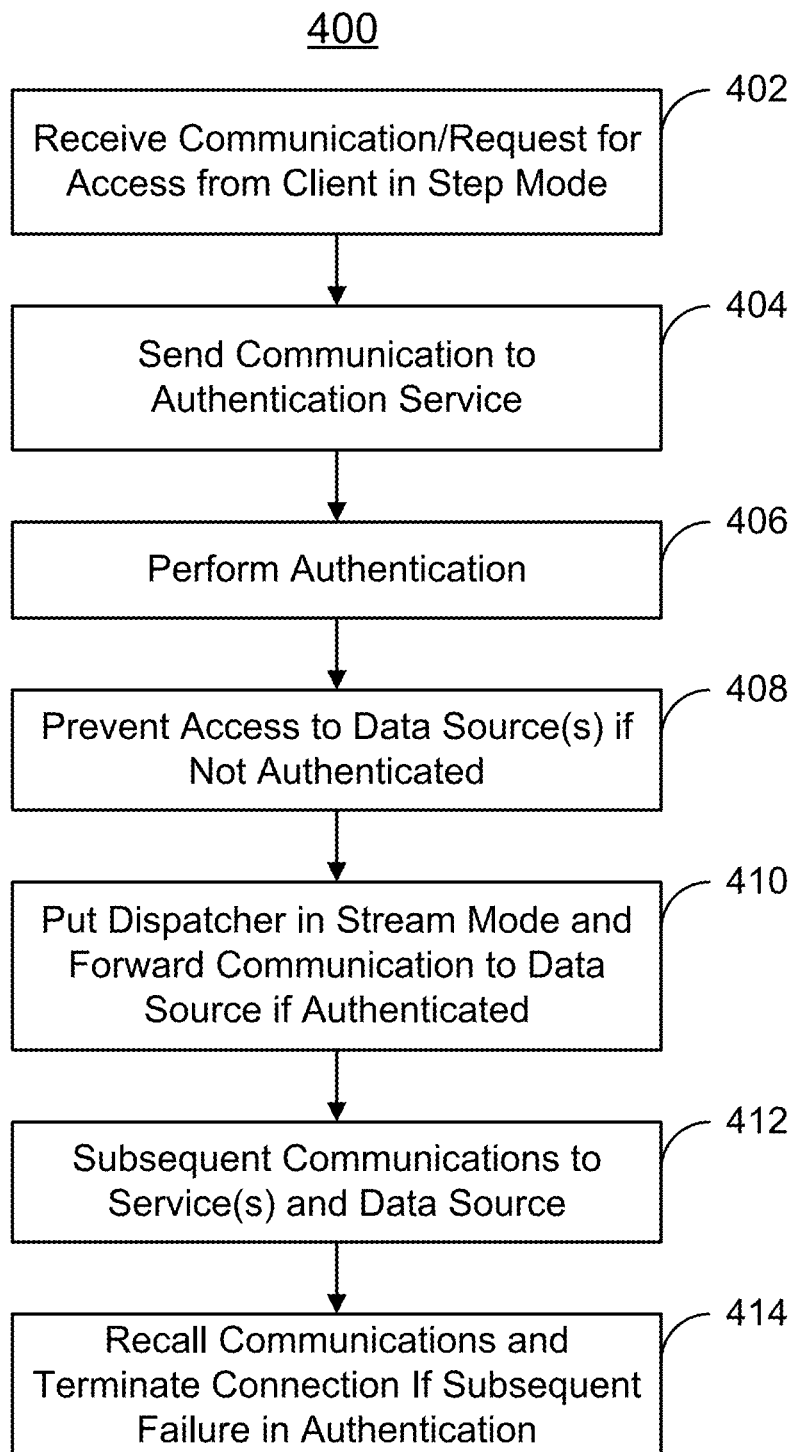
FIG. 4 is a flow chart depicting an exemplary embodiment of a method for authenticating a client for a data source.

FIG. 4 is a flow chart depicting an exemplary embodiment of method 400 for authenticating a client for a data source. Method 400 is described in the context of system 100. However, method 400 may be used in connection with other systems including but not limited to systems 200 and 300. For simplicity, certain steps of method 400 are depicted. Method 400 may include other and/or additional steps and substeps. Further, the steps of method 400 may be performed in another order including performing portions or all of some steps in parallel. Method 400 may be carried out each time a client commences a session for communication with a data source.

Dispatcher 112 of wrapper 110 receives a communication requesting access to one or more data sources from a client, at 402. For example, dispatcher 112 may receive a communication requesting access to data source 102 from client 106-1. The communication may be received at dispatcher 112 after a connection between wrapper 110 and client 106-1 is established and a corresponding routine or other corresponding lightweight process generated. In addition to identifying data source 102 and client 106-1, the request may also include credentials for client 106-1. In some embodiments, at the start of method 400, dispatcher 112 is in step mode. At 404, therefore, dispatcher 112 provides the communication from client 106-1 to service 114-1, which performs authentication. For example, dispatcher 112 may send the payload of the communication to service 114-1 via a message bus (not separately labeled in FIG. 1). However, because dispatcher 112 is in step mode, dispatcher 112 does not also forward the communication to the requested data source 102. Further, because dispatcher 112 is a data agnostic component such as a Layer 4 component, dispatcher 112 does not perform a deeper inspection of the communication. Instead, dispatcher 112 simply holds (e.g. stores) the communication because dispatcher 112 is in step mode. If dispatcher 112 were in stream mode, dispatcher 112 would also forward the packet to the appropriate data source 102.

Service 114-1 performs authentication of client 106-1, at 406. In some embodiments, a certificate and/or other credentials such as a username and password may be used to perform authentication. In some embodiments, MFA (described in further detail below) may be used. In addition, if collectors such as collectors 320 are present in the system, the context of the communication provided by client 106-1 may be used in authentication at 406. For example, the context appended to the communication by a collector 320 may be compared to a behavior baseline modeled by system

100 from previous communications by client 106-1 to determine whether the context sufficiently matches previous behavior. Other and/or additional authentication mechanisms may be used in some embodiments.

If the client requesting access is not authenticated, then access to the data source is prevented, at 408. For example, the routine corresponding to the connection with client 106-1 may be notified and the connection terminated. Other mechanisms for preventing access may also be used. The communication held by dispatcher 112 is also discarded. In other embodiments, if dispatcher 112 had forwarded the communication to data source 102, then the communication is recalled at 408.

If the client is authenticated, then at 410, dispatcher 112 is placed in stream mode at 410. As a result, the communication being held is forwarded to the selected data source 102 at 410. In addition, future communications corresponding to the authenticated connection with client 106-1 are forwarded to the selected data source 102 and appropriate service(s) 114, at 412. For example, service 114-1 may provide a message to dispatcher 112 changing dispatcher 112 from step mode to stream mode at 410. Consequently, dispatcher 112 also forwards the communication to corresponding data source 102. Future communications received at dispatcher 112 from client 106-1 via the same connection may be both provided to one of the services 114 and to the selected data source 102. Thus, clients 106 are allowed to request and receive data from data source 102. However, authentication may still continue. For example, behavioral baselining described herein, periodic requests to revalidate credentials or other mechanisms may be used, at 414. If client 106-1 loses its authentication, then communications from the client to the selected data source may be recalled and further access to the data source blocked, at 414. For example, the routine responsible for the connection to client 106-1 may be notified and the connection terminated. Thus, connection to clients 106 may be securely managed using dispatcher 112 that is a data agnostic component, such as a Layer 4 component.

Using method 400, data sources 102 and 104 may be secured. Because of the use of data agnostic dispatcher 112, wrapper 110 may function with a variety of data sources 102 and 104 that do not share a platform or are otherwise incompatible. Deployment of wrapper 110, for example either in the cloud or on premises, may require no change in existing code. Consequently, implementation of wrapper 110 may be seamless and relatively easy for developers. Further, wrapper 110 need not protect every component within a particular organization. Instead, only selected data sources may be protected. Use of services 114 for security as described herein may be both more effective at securing sensitive data and less expensive because data sources may not significantly increase in number even when the number of applications that access the data sources grows significantly. Further, utilizing services 114, the level of security and/or functions provided by wrapper 110 may differ for different data sources.

FIG. 5 is a flow chart depicting an exemplary embodiment of method 500 for performing one or more services for a client and a data source. Method 500 is described in the context of system 100. However, method 500 may be used in connection with other systems including but not limited to systems 200 and 300. For simplicity, certain steps of method 500 are depicted. Method 500 may include other and/or additional steps and substeps. Further, the steps of method 500 may be performed in another order including performing portions or all of some steps in parallel. In some embodiments, method 500 may be considered to be operable once authentication of the client is completed and dispatcher 112 is in stream mode.

Dispatcher 112 of wrapper 110 receives a communication from a client, at 502. For example, dispatcher 112 may receive a communication from client 106-2 with a query for data source 104. One or more services 114 are desired to be used with the communication. Therefore, dispatcher 112 provides the communication from client 106-2 to service(s) 114, at 504. In addition, dispatcher 112 forwards the communication to the requested data source 104 at 504. Stated differently, dispatcher 112 provides the relevant portions of the communication to both the desired data source(s) and service(s). Because dispatcher 112 is a data agnostic component such as a Layer 4 component, dispatcher 112 does not perform a deeper inspection of the communication. Instead, dispatcher 112 simply forwards the communication both to the desired data source(s) 102 and/or 104 and to service(s) 114 for further processing.

The desired functions are provided using one or more of the services 114, at 506. This may include inspecting the communication as well as completing other tasks. For example, at 506, services 114 may be used for authentication of various types, query analysis, federated identity management, behavioral modeling, query rewriting, caching, tokenization or encryption of sensitive data and/or other processes. Services 114 may thus be Layer 7 components. However, tasks performed by services 114 are decoupled from forwarding of the communication to data sources by dispatcher 112.

Using system method 500 and wrapper 110, data sources 102 and 104 may be secured and other features may be provided via service(s) 114. Because of the use of data agnostic dispatcher 112, wrapper 110 may function with a variety of data sources 102 and 104 that do not share a platform or are otherwise incompatible. Functions performed by services 114 are decoupled from forwarding of communications to the data sources by dispatcher 112. Thus, a variety of features may be provided for data sources 102 and 104 without adversely affecting performance of data sources 102 and 104. Consequently, performance of system 100 may be improved.

FIG. 6 is a flow chart depicting an exemplary embodiment of method 600 for performing multifactor authentication (MFA) for a client and a data source. Method 600 is described in the context of system 300. However, method 600 may be used in connection with other systems including but not limited to systems 100 and 200. For simplicity, certain steps of method 600 are depicted. Method 600 may include other and/or additional steps and substeps. Further, the steps of method 600 may be performed in another order including performing portions or all of some steps in parallel. In some embodiments, method 600 may be considered to be used in implementing 406 and/or 506 of method 400 and/or 500. For the purposes of explanation, suppose service 314-1 provides multi-factor authentication. Method 600 may be considered to start after the MFA service 314-1 receives the communication from dispatcher 312. Further, dispatcher 312 may be in step mode at the start of method 600. Thus, dispatcher 312 may hold the communication instead of forwarding the communication to data source(s). In other embodiments, dispatcher 312 may be in stream mode. Dispatcher 312 may, therefore, may also provide the communication to the appropriate data sources. MFA may be performed in addition to other authentication, such as certificate or user identification/password based authentication, performed by service 314-1 or another service. Although described in the context of authentication for access to a single data source, in some embodiments, method 600 may be used to authenticate client(s) for multiple data sources.

Service 314-1 calls a MFA utility 330-1, at 602. The MFA utility 330-1 contacted at 602 may be a third party MFA such as DUO. Alternatively, the MFA utility 330-1 may be part of the organization to which data source(s) 302 and/or 304 belong. MFA utility 330-1 performs multi-factor authentication for the requesting client, at 604. For example, suppose end user of client 306-2 has requested access to data source 304. The user identification and password may have been validated by service 314-1. At 602, the MFA utility 330-1 is called. Thus, the end user is separately contacted by MFA utility 330-1 at 604 and requested to confirm the user's by the MFA facility. For example, the end user may be required to enter a code or respond to a prompt on a separate device. As part of 604, service 314-1 is informed of whether the multi-factor authentication by MFA utility 330-1 is successful. Stated differently, as part of 604, service 314-1 receives from MFA utility 330-1 a success indication. The success indication informs MFA utility 330-1 of whether or not MFA authentication was successful.

If the multi-factor authentication by MFA utility 330-1 is successful, then service 314-1 instructs dispatcher 312 to forward communications to the requested data source 304, at 606. In some embodiments, in response to receiving a positive success indication (i.e. that MFA authentication is successful), service 314-1 directs dispatcher 312 to forward communications to the requested data source 304. In some embodiments, dispatcher 312 is instructed to change from step mode to stream mode at 606. Thus, subsequent communications may be provided both to the data source 304 and one or more service(s) 314. In other embodiments, dispatcher 312 is simply allowed to continue forwarding communications to data source 304 at 606. If, however, multifactor authentication was unsuccessful, service 314-1 instructs dispatcher 312 to prevent access to the requested data source 304, at 608. For example, in response to receiving a negative success indication (i.e. that MFA authentication is unsuccessful), service 314-1 directs dispatcher 312 to prevent access to the requested data source 304. In response, dispatcher 312 may instruct the corresponding routine to terminate the connection with the requesting client 106. If the communication has already been forwarded to data source 304, then dispatcher 312 also recalls the communication. In some embodiments, dispatcher 312 may be instructed to remain in step mode and the client requested to resubmit the credentials and/or another mechanism for authentication used. In some embodiments, other action(s) may be taken in response to MA being unsuccessful.

Using method 600 MFA may be provided for data source(s) 302 and/or 304 in a data agnostic manner. Certain data sources, such as databases typically do not support MFA. Thus, method 600 may provide additional security to such data sources without requiring changes to the code of data sources 302 and 304. Security of system 100 may thus be improved in a simple, cost effective manner.

Figure 7:
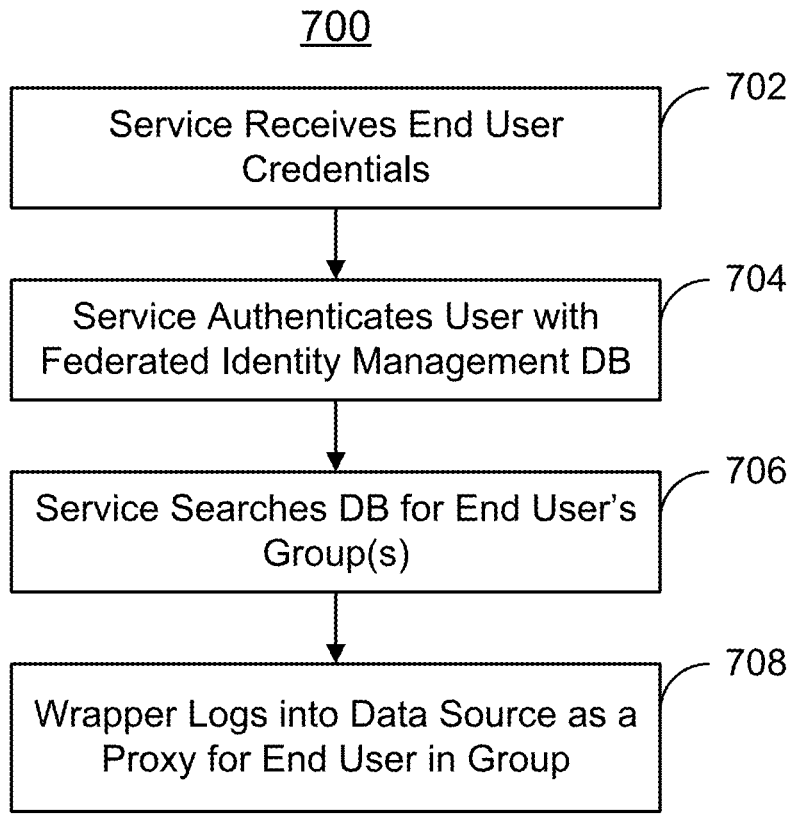
FIG. 7 is a flow chart depicting an exemplary embodiment of a method for performing federated identity management for a client for a data source.

FIG. 7 is a flow chart depicting an exemplary embodiment of method 700 for performing federated identity management for a client for a data source. Federated identity management allows end users to access various facilities in an organization, such as multiple databases, email, analytics or other applications, based on a group identity and using a single set of credentials. For example, an end user may be a data analyst in a finance department. The end user may thus be considered a member of three groups: employees, data analysts and the finance department. A user identification and password for the end user may allow the end user to access their company/employee email, applications for the finance department, databases including information used by the finance department such as financial projections for the organization, analytics applications accessible by data analysts and other data based on the end user's membership in various groups within the organization. Federated identity management may use protocols such as lightweight directory access protocols (LDAP) and directories defining the groups to which each end user belongs.

Method 700 is described in the context of system 300. However, method 700 may be used in connection with other systems including but not limited to systems 100 and 200. For simplicity, certain steps of method 700 are depicted. Method 700 may include other and/or additional steps and substeps. Further, the steps of method 700 may be performed in another order including performing portions or all of some steps in parallel. In some embodiments, method 700 may be considered to be used in implementing 506 of method 500. For the purposes of explanation, service 314-6 is considered to provide federated identity management. Method 700 may be considered to start after service 314-6 receives the communication from dispatcher 312.

Service 314-6 receives the end user's credentials, at 702. For example, dispatcher 312 forwards to service 314-6 a communication requesting access to data source 302. The communication may include the end user's user identification and password for federated identity management. In other embodiments, the end user credentials are otherwise associated with the communication but are provided to service 314-6. Service 314-6 authenticates the end user with a federated identity management utility or database 330-2, such as an LDAP directory, at 704. To authenticate the end user the user identification and password are utilized. Service 314-6 searches the federated identity management database 330-2 for the group(s) to which the end user belongs, at 706. Using one or more of the group(s) of which the user is a member, wrapper 310 logs onto the data source 302 as a proxy for the end user, at 708. The end user may then access data source 302 in accordance with the privilege and limitations of the group(s) to which the end user belongs.

Using method 700, federated identity management can be achieved for data source(s) 302 and/or 304. Some databases do not support federated identity management. Method 700 and wrapper 310 having data agnostic dispatcher 312 may allow for federated identity management for such databases without changes to the databases. Thus, an end user may be able to access the desired data sources. Further, the organization can manage access to the data sources using groups in the federated identity management database. This may be achieved without requiring changes to data sources 302 and 304. Because wrapper 310 accesses data sources 302 and/or 304 as a proxy for the end user, wrapper 310 may log activities of the end user. For example federated identity management service 314-6 may store information related to queries performed by the end user as well as the identity of the end user. Thus, despite using federated identity management to allow access to applications and data sources based on groups, the organization may obtain visibility into the activities of individual end users. In addition to improving case of administration via federated identity management, improved information and control over individuals' use of data sources 302 and 304 may be achieved.

Figure 8:
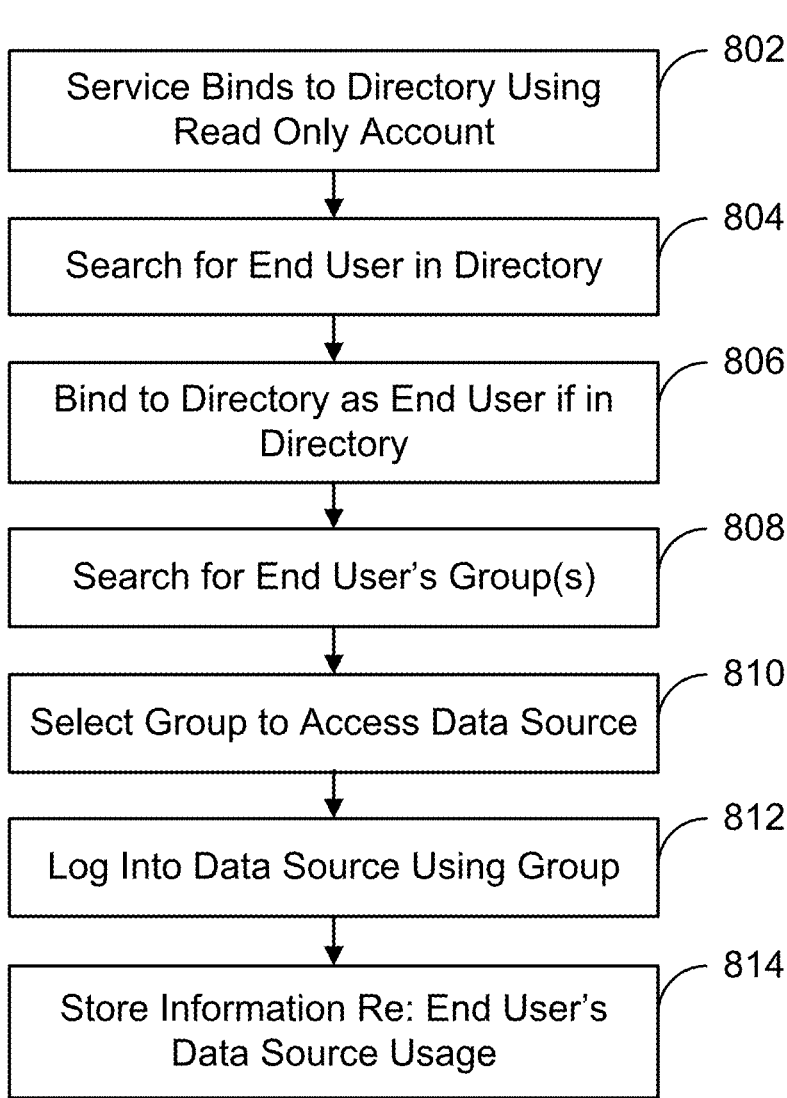
FIG. 8 is a flow chart depicting another exemplary embodiment of a method for authenticating a client for a data source using federated identity management.

FIG. 8 is a flow chart depicting an exemplary embodiment of method 800 for performing federated identity management for a client for a data source using an LDAP directory.

Method 800 is described in the context of system 300. However, method 800 may be used in connection with other systems including but not limited to systems 100 and 200. For simplicity, certain steps of method 800 are depicted. Method 800 may include other and/or additional steps and substeps. Further, the steps of method 800 may be performed in another order including performing portions or all of some steps in parallel. In some embodiments, method 800 may be considered to be used in implementing 506 of method 500 and/or 704, 706 and/or 708 of method 700. For the purposes of explanation of method 800, service 314-6 is considered to provide federated identity management via LDAP. Method 800 is considered to commence after wrapper 310 is provided with a specialized account for LDAP directory 330-2. The specialized account allows wrapper 310 to obtain information from LDAP directory 330-2 that is not available to a typical end user, such as the identification of end users and the groups to which end users belong. In some embodiments, the account is a read only account for wrapper 310.

Service 314-6 binds to the LDAP directory using the read only account at 802. This may occur at some time before receipt of the end user's credentials and the request to access a data source using federated identity management. The binding of service 314-6 with the LDAP directory allows service 314-6 to provide federated identity management services in some embodiments.

A communication requesting access to data source(s) 302 and/or 304 is received at dispatcher 310 and provided to service 314-6 in a manner analogous to 502 and 504 of method 500. The communication includes the end user's LDAP credentials. Thus, the end user's LDAP credentials are received at service 314-6. After receiving the end user's LDAP credentials, service 314-6 may search for the end user in the LDAP directory using the read only account, at 804. Searching LDAP directory 330-2 allows service 314-6 to determine whether the user exists in LDAP directory 330-2. If not, wrapper 310 may prevent access to the desired data source(s). If, however, the end user is found at 804, then service 314-6 binds to the LDAP directory as a proxy for the end user, at 806.

Service 314-6 may then request a search for the groups to which the end user belongs, at 808. This is facilitated by the read only account for wrapper 310. Thus, service 314-6 may determine the groups to which the end user belongs as well as the privileges and limitations on each group. A group to be used for accessing the data source(s) 302 and/or 304 is selected at 810. In some embodiments, service 314-6 ranks groups based upon their privileges. A group having more privileges (e.g. able to access more data sources or more information on a particular data source) is ranked higher. In some embodiments, service 314-6 selects the highest ranked group for the end user. In some embodiments, service 314-6 selects the lowest ranked group. In some embodiments, the user is allowed to select the group. In other embodiments, another selection mechanism may be used.

The desired data source(s) are accessed using the selected group, at 812. Thus, the end user may access data and/or applications based upon their membership in the selected group. Information related to the end user's activities is logged by wrapper 310, at 814. For example, services 314-6 may directly log the end user activities or may utilize another service, such as query analysis, to do so.

Using method 800, an end user may be able to access the desired data sources via federated identity management performed through an LDAP directory. The benefits of federated identity management may thus be achieved. In addition, the end user's actions may be logged. Thus, visibility into the activities of individual end users may be obtained.

FIG. 9 is a flow chart depicting an exemplary embodiment of method 900 for analyzing and logging information related to queries of a data source. Method 900 is described in the context of system 100. However, method 900 may be used in connection with other systems including but not limited to systems 200 and 300. For simplicity, certain steps of method 900 are depicted. Method 900 may include other and/or additional steps and substeps. Further, the steps of method 900 may be performed in another order including performing portions or all of some steps in parallel. In some embodiments, method 900 may be considered to be used in implementing 506 of method 500. For the purposes of explanation of method 900, service 114-1 is considered to provide query analysis and logging. Thus, a client, such as client 106-1 may be considered to be authenticated for data source(s) 102 and/or 104 and to perform a query for data on one or both of data sources 102 and 104. In some embodiments, the query may be an SQL query.

Wrapper 110 receives an identification of information of interest in the data source(s) 102 and/or 104, at 902. Also at 902, policies related to the sensitive information are also received. Reception of this information at 902 may be decoupled from receiving queries and analyzing queries for the remainder of method 900. For example, owner(s) of data source(s) 102 and/or 104 may indicated to wrapper 110 which tables, columns/rows in the tables, and/or entries in the tables include information that is of interest or sensitive. For example, tables including customer names, social security numbers (SSNs) and/or credit card numbers (CCNs) may be identified at 902. Columns within the tables indicating the SSN, CCN and customer name, and/or individual entries such as a particular customer's name, may also be identified at 902. This identification provides to wrapper 110 information which is desired to be logged and/or otherwise managed. Further, policies related to this information are provided at 902. Whether any logging is to be performed or limited is provided to wrapper at 902. For example, any user access of customer tables may be desired to be logged. The policies indicate that queries including such accesses are to be logged. Whether data such as SSNs generated by a query of the customer table should be redacted for the log may also be indicated in the policies.

Wrapper 110 receives a query from a client at dispatcher 112 and provides the query to service 114-1, at 903. The query may also be sent from dispatcher 112 to the appropriate data source(s) as part of 903. Process 903 is analogous to 502 and 504 of method 500. Thus, the query is received at service 114-1. Service 114-1 parses a query provided by a client 106, at 904. For example, a client 106-1 may provide a query for data source 102 to wrapper 110. Dispatcher 112 receives the query and provides the query both to data source 102 and to service 114-1. Service 114-1 parses the query to determine which operations are requested and on what portions of data source 102. Service 114-1 thus emits a logical structure describing the query and based on the parsing, at 906. In some embodiments, the logical structure is an abstract syntax tree corresponding to the query. Each node in the tree may represent a table being searched, operation in the query, as well as information about the operation. For example, a node may indicate a join operation or a search operation and be annotated with limitations on the operation.

The query is logged, at 908. The log may include the end user/client 106-1 that provided the query as well as the query string. In addition, the features extracted from the abstract syntax tree may be logged in a manner that is indexable or otherwise more accessible to analytics. Further, the log may be configured to be human readable. In some embodiments, a JSON log may be used. For example, a list of the operations and tables accessed in the query may be included in the log. Sensitive information such as SSN may be redacted from the log in accordance with the identification of sensitive information and policies relating to sensitive information received at 902. Thus, a placeholder may be provided in the log in lieu of the actual sensitive information accessed by the query. In some embodiments, the logical structure and/or log are analyzed at 909. This process may include analyzing the abstract syntax tree and/or information in the log.

Based on the query analysis and/or log, additional action may be taken by wrapper 110, at 910. For example, a query rewriting service that is part of service 114-1 or a separate service may be employed if it is determined in 909 that the log generated in 908 indicates that the query may adversely affect performance. For example, limits may be placed on a query, clauses such as an "OR" clause and/or a tautology identified and/or removed. As a result, queries that result in too many rows being returned may be rewritten to reduce the number of rows. If the log or other portion of the query analysis indicates that the query may represent an attack, then access to the data source may be denied at 910. For example, the analysis at 909 of the logical structure and log may indicate that the query includes wildcards or tautologies in users' names. The corresponding routine may terminate the connection to the client from which the query originated. If the query has been passed on to data source 102, then the query may be canceled at 910. Unwanted exfiltration of sensitive information may thus be prevented. If the query analysis indicates that a similar query was recently serviced, then some or all of the information for the similar query that already exists in a cache may be used to service the query. If the query can be completely serviced by information in the cache, then the query may be recalled from/canceled before or during servicing by data source 102. Thus, various actions may be taken based upon the analysis of the query by service 114-1.

For example, suppose as mentioned above that data source 102 includes a customer table of customer information having columns of customer names, customer SSNs, customer CCNs, tokenized CCNs (e.g. CCN encrypted with FPE or represented by a token), and customer identifiers (CIDs). Suppose data source 102 also includes an order table including a table of customer orders. The table includes a column of order customer identifiers (OCIDs) and multiple columns of orders for each customer identifier. In each order column, the item prices for the order are indicated. The order customer identifier for the order table is the same as the customer identifier in the customer table for data source 102. Query analysis and logging may be performed by service 114-1.

Figure 10:
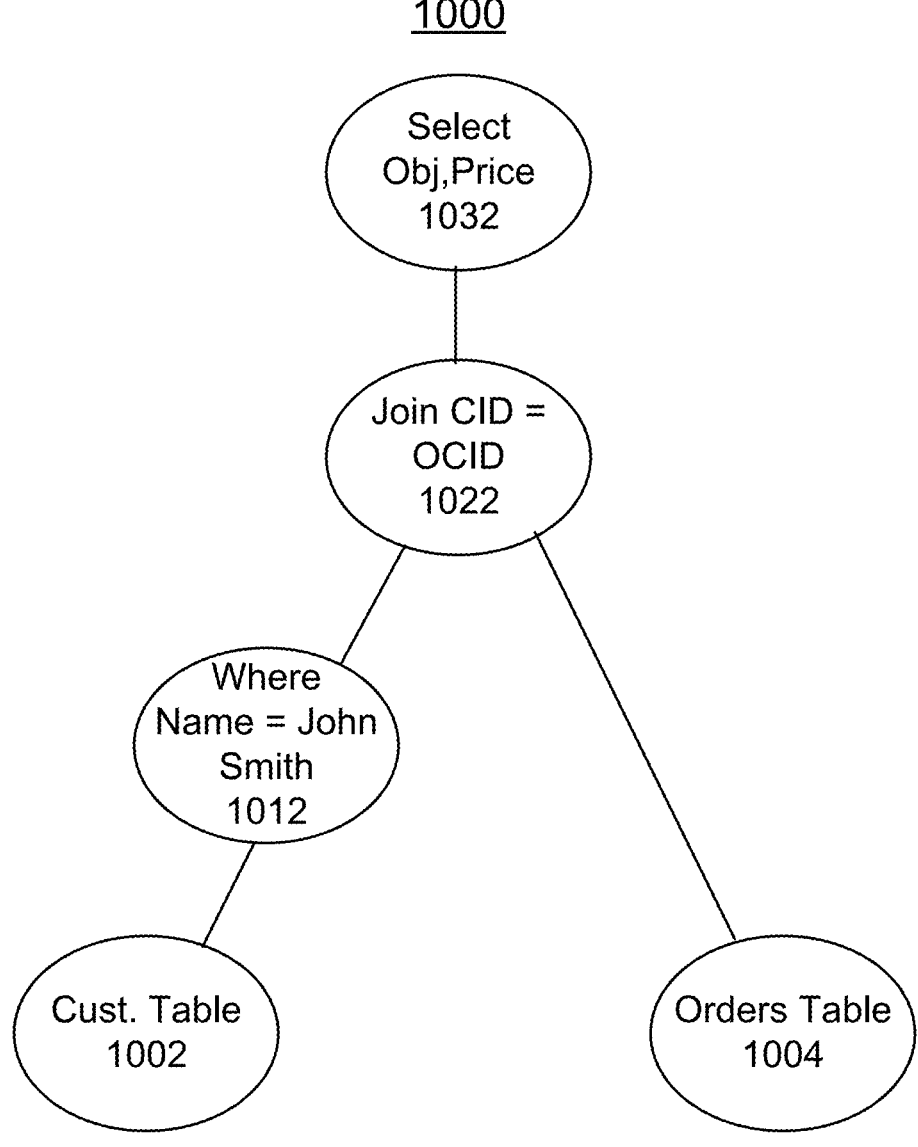
FIG. 10 is a diagram depicting an exemplary embodiment of an abstract syntax tree.

At 902, service 114-1 is informed that the customer table and the columns of customer names, customer SSNs and (tokenized) customer CCNs are sensitive information for which activity is desired to be logged. Also at 902, service 114-1 is informed that customer names and SSNs are to be redacted from the log. A query of data source 102 may be provided to dispatcher 112 by end user of client 106-1. Dispatcher 112 forwards the query to data source 102 and to service 114-1. The query is: select object price from customer table join order table on customer identifier=order customer identifier and where name=John Smith (where John is a name of a particular customer). Thus, the query determines the price of objects ordered by John Smith. FIG. 10 depicts the corresponding abstract syntax tree 1000 generated from the query at 906. The abstract syntax tree has been annotated for clarity. Nodes 1002, 1004, 1012, 1022 and 1032 and lines connecting nodes 1002, 1004, 1012, 1022 and 1032 represent the query. From abstract syntax tree 1002, a log is generated by service 114-1 at 908. The log indicates that the customer table has been accessed by end user of client 106-1, that column customer name was read, and the where name=[redacted] was accessed. This information may be provided in a format that is readily usable by analytics, indexable and/or searchable. In some embodiments, the string forming the query may also be provided in the log. However, because they were not identified as being of interest, the order table, CID, OCID and object price are not included in the indexable portion of the log.

Thus, using method 900, performance of system 100 may be improved. Method 900 may facilitate analysis of queries performed, aid in response to attacks, and/or improve performance of the data source. Because dispatcher 110 is data agnostic and may be a transport layer component, this may be achieved without requiring changes to data sources 102 and 104 while maintaining stability of the data sources 102 and 104. Thus, performance and security for system 100 may be enhanced.

FIGS. 11A and 11B are flow charts depicting exemplary embodiments of methods for utilizing tokenization and/or encryption of sensitive data. FIG. 11A is a flow chart depicting an exemplary embodiment of method 1100 for using tokenization and/or encryption for storing data at a data source. Method 1100 is described in the context of system 300. However, method 1100 may be used in connection with other systems including but not limited to systems 100 and 200. For simplicity, certain steps of method 1100 are depicted. Method 1100 may include other and/or additional steps and substeps. Further, the steps of method 1100 may be performed in another order including performing portions or all of some steps in parallel. In some embodiments, method 1100 may be considered to be used in implementing 506 of method 500.

Method 1100 may be considered to start after system 300 receives policies indicating how sensitive data are to be treated. For example, policies indicating what data are sensitive (e.g. which tables/entries include sensitive data), what clients are allowed to have access to the sensitive data, for what purposes client(s) are allowed to have access to the sensitive data, how the sensitive data are to be anonymized (e.g. tokenized and/or encrypted), and/or other information desired by controller of data sources 302 and/or 304 have already been received by wrapper 310 and provided to the appropriate service(s). Although described in the context of access to a single data source, in some embodiments, method 1100 may be used for multiple data sources. In some embodiments, the same service fulfills request to store sensitive data and requests to obtain sensitive data. In some embodiments, some service(s) may service requests to store data/tokenize data while other service(s) are used obtain the tokenized data. However, such services communicate in order to service at least some of the requests. In some embodiments, the same service may utilize different types of anonymization (e.g. tokenization and encryption). In other embodiments, different services may be used for different types of anonymization. For example, one service may tokenize data while another service encrypts data. Method 1100 is described as being used in connection with method 1150. In other embodiments, method 1100 may be used with a different method for accessing encrypted/tokenized data.

A request from a client to store sensitive data at a data source is received by a wrapper, at 1102. The dispatcher, which is data agnostic, forwards the request to an encryption/tokenization service for anonymization of the sensitive data desired to be stored, at 1104. Based on the policies provided and/or capabilities of the services, the sensitive data is and anonymized, at 1106. In some embodiments, the data desired to be stored includes sensitive data desired to be anonymized as well as data that need not by anonymized. In such embodiments, 1106 also includes identifying the sensitive data to be anonymized. In some embodiments, anonymizing data includes encrypting and/or tokenizing the data. For some sensitive data, encryption such as format preserving encryption (FPE) may be used. For example, CCNs and SSNs may be encrypted using FPE such that the encrypted data has the same number of digits as the CCN and SSN (i.e. such that the format is preserved) but does not have intrinsic meaning. The alphanumeric string having nine members may replace an SSN. Other types of encryption, tokenization, and/or data masking may also be used at 1106. Thus, at 1106 the sensitive data is anonymized. Because policies may be used to determine how and what data are encrypted/tokenized, 1106 is performed on an attribute level. For example, the CCN of a user may be encrypted by FPE, but the SSN of the same user may be replaced by a token based on the policies used by the encryption/tokenization service. The anonymized data is stored in the data source, at 1108. Thus, the anonymized data may be retained in place of the actual sensitive data. In some embodiments, the sensitive data may also be stored, for example in a secure data vault, which may require enhanced authentication to access. Thus, using method 1100, sensitive data may be tokenized and/or encrypted and stored using a data agnostic dispatcher.

FIG. 11B is a flow chart depicting an exemplary embodiment of method 1150 for accessing tokenized and/or encrypted data from a data source. Method 1150 is described in the context of system 300. However, method 1150 may be used in connection with other systems including but not limited to systems 100 and 200. For simplicity, certain steps of method 1150 are depicted. Method 1150 may include other and/or additional steps and substeps. Further, the steps of method 1150 may be performed in another order including performing portions or all of some steps in parallel. In some embodiments, method 1150 may be considered to be used in implementing 506 of method 500. Method 1150 may be considered to start after system 300 receives policies indicating how sensitive data are to be treated. For example, policies indicating what data are sensitive (e.g. which tables/entries include sensitive data), what clients are allowed to have access to the sensitive data, for what purposes client(s) are allowed to have access to the sensitive data, how the sensitive data are to be anonymized (e.g. tokenized and/or encrypted), and/or other information desired by controller of data sources 302 and/or 304 have already been received by wrapper 310 and provided to the appropriate service(s). Although described in the context of access to a single data source, in some embodiments, method 1150 may be used for multiple data sources. In some embodiments, the same service fulfills request to store sensitive data and requests to obtain sensitive data. In some embodiments, some service(s) may service requests to store data/tokenize data while other service(s) are used obtain the tokenized data. However, such services communicate in order to service at least some of the requests. In some embodiments, the same service may utilize different types of anonymization (e.g. tokenization and encryption). In other embodiments, different services may be used for different types of anonymization. For example, one service may tokenize data while another service encrypts data. Method 1150 is described as being used in connection with method 1100. In other embodiments, method 1150 may be used with a different method for anonymizing data.

A request for the sensitive data stored at data source is received by the wrapper, at 1152. The request may come from the same client that stored the data or a different client. Because request(s) for data may be independent of storage, 1152 through 1162 may be decoupled from 1102 through 1108. For example, the request may be received at 1152 at a different time, or may not be received. Thus, methods 1100 and 1150 are separately described. The dispatcher provides the request to access sensitive data to encryption/tokenization service, at 1154. The request may also be forwarded to the data source storing the anonymized data.

The encryption/tokenization service determines what type of authorization the requestor possesses, at 1156. The requester may only be authorized to receive the anonymized (e.g. tokenized/encrypted) data. For example, the requesting client might be a computer system of data scientist associated with system 300. The data scientist/client may be allowed to track use of a credit card number, but not be authorized to know the actual credit card number. The requester may be authorized to receive the original, sensitive data. For example, the requesting client might be a merchant's payment system or the original user's computer systems, both of which may be authorized to receive the de-anonymized (e.g. unencrypted/de-tokenized) sensitive data. However, the requester may be unauthorized to receive either data. For example, the requesting client might be a malicious individual attempting to steal the sensitive data. At 1156, therefore, the encryption/tokenization service validates credentials for the requesting client. The encryption/tokenization service may use passwords, certificates, multifactor authentication, behavioral baselining through collector(s) and/or other mechanism(s). Thus, encryption/tokenization service may call another service to perform authentication at 1156.

If the requesting client is determined to be authorized to receive the sensitive data, then the anonymized data stored at the data source is retrieved, de-anonymized and provided to client, at 1158. For example, encryption/tokenization service may decrypt and/or detokenize the data that was stored in the data source. In another embodiment, instead of or in addition to decrypting/detokenizing the data, encryption/tokenization service may retrieve the original, sensitive data from a secure data vault (not shown in FIGS. 3 and 11A-11B). The sensitive data is then sent to the authorized requester at 1158.

If the requesting client is determined to be authorized to receive only the anonymized data, then this anonymized data are retrieved and sent to the requester, at 1160. For example, encryption/tokenization service may simply retrieve the anonymized data from the data source and forward this data to the requesting client. In some embodiments, a requester may be authorized to receive either or both of the sensitive data and the anonymized data. In such embodiments, 1158 and/or 1160 may include determining whether the requester has selected the anonymized/de-anonymized data and providing the anonymized/de-anonymized data. In some embodiments, both the anonymized and the de-anonymized data might be provided.

If, however, it is determined that the requester was not authorized, then other action is taken at 1162. For example, the routine may terminate the connection to client as described above, the communication may be recalled from the data source, the client may be blacklisted, managers of system 300 and/or owner of the sensitive data may be notified of the attempted breach and/or other action taken. For example, as discussed above, the corresponding routine may terminate the connection to the client from which the query originated. If the query has been passed on to the data source, then the query may be canceled at 1162. Unwanted exfiltration of sensitive information may thus be prevented.

Although described in the context of anonymized data at 1106 and storing the anonymized data at 1108, in another embodiment, step 1106 might be skipped and the sensitive data stored at 1108. However, in such embodiments, at 1158 no decryption is performed for the requester determined to be authorized to receive the sensitive data. Further, for requesters determined to be authorized to receive only encrypted/tokenized data, the data are encrypted/tokenized and then provided at 1160. Thus, methods 1100 and 1150 may be adapted to the case where sensitive data are stored.

For example, a request from client 306-1 to store sensitive data at data source 302 may be received by wrapper 310, at 1102. Dispatcher 312 forwards the request to encryption/tokenization service 314-2 for anonymization, at 1104. Based on the policies provided and/or capabilities of encryption/tokenization service 314-2, the sensitive data is identified and anonymized, at 1106. For example, encryption/tokenization service 314-2 may encrypt some sensitive data and tokenize other sensitive data. The anonymized data is stored in data source 302, at 1108.

A request from client 306-2 for the sensitive data stored at the data source is received by the wrapper 310, at 1152. Dispatcher 310 provides the request to access sensitive data to encryption/tokenization service 314-2, at 112. The request may also be forwarded by dispatcher 312 to data source 302.

Encryption/tokenization service 314-2 determines what type of authorization the requestor possesses, at 1156. Thus, encryption/tokenization service 314-2 validates credentials for the requesting client 306-2.

If the requesting client 306-2 is determined to be authorized to receive the sensitive data, then the anonymized data stored at data source 302 is retrieved, decrypted/detokenized and provided to client 306-2, at 1158. In another embodiment, instead of or in addition to decrypting/detokenizing the data, encryption/tokenization service 314-2 may retrieve the original, sensitive data from a secure data vault. The sensitive data is then sent to the authorized requester. If the requesting client 306-2 is determined to be authorized to receive only the anonymized data, then encryption/tokenization service 314-2 retrieves the anonymized data from data source 302 and forwards this data to the requesting client 306-2. If, however, it is determined that the requester was not authorized, then the routine may terminate the connection to client 306-2, the communication may be canceled or recalled from data source 302, client 306-2 may be blacklisted, managers of system 300 and/or owner of the sensitive data (e.g. user of client 306-1) may be notified of the attempted breach and/or other action taken.

Using methods 1100 and 1150 sensitive data may be more securely stored and retrieved. Instead of storing sensitive data, anonymized data may be stored at 1108. How and what data are anonymized may be determined on an attribute level, which improves flexibility of methods 1100 and 1150. This improves the ability of system 300 and methods 1100 and 1150 to protect sensitive data from being inappropriately accessed. Because these functions are provided via service (s) 314, the enhanced security may be provided for data source(s) 302 and/or 304 that do not otherwise support encrypted data. Stated differently, secure storage and encryption/tokenization of data may be performed in a data agnostic manner. Thus, methods 1100 and 1150 may provide additional security to such data sources without requiring changes to the code of data sources 302 and 304. Security may thus be improved in a simple, cost effective manner.

FIGS. 12A and 12B are flow charts depicting exemplary embodiments of methods for providing client information and for performing behavioral baselining for clients. FIG. 12A is a flow chart depicting an exemplary embodiment of method 1200 for providing client information and may be used as part of performing behavioral baselining for a client. Method 1200 is described in the context of system 300. However, method 1200 may be used in connection with other systems including but not limited to systems 100 and 200 that employ collectors such as collectors 320. For simplicity, certain steps of method 1200 are depicted. Method 1200 may include other and/or additional steps and substeps. Further, the steps of method 1200 may be performed in another order including performing portions or all of some steps in parallel. In some embodiments, method 1200 may be considered to be used in implementing 506 of method 500. Method 1200 is described in the context of clients 306-2 and 306-3, collectors 320-2 and 320-3, service 314-2 and data source 302. Thus, method 1200 commences after collectors 320 have been provided on one or more clients 306 utilizing data sources. However, in other embodiments, other clients, collectors, service(s) and/or other data sources may be used.

Communications for data source(s) to be issued by a client are intercepted, for example by a collector at the client, at 1202. In some embodiments, queries, method or API calls, commands or other messages may be intercepted before being provided from the client for transmission to the wrapper. In some embodiments, for example, a collector may attach itself to a client application and use Java Database Connectivity (JDBC) to intercept queries from the client of the data source(s). Thus, the collectors monitor the corresponding clients and intercept particular calls.

The state of the client issuing the communication is determined and attached to/associated with the intercepted communication, at 1204. For example, the type of call, the type of session/session identification, user identification for the session, the type of command (e.g. get, put, post, and delete commands), APIs, IP address, query attributes, method calls, order of queries, and/or application making the calls may be detected by the collector and attached to the communication at 1204. These attributes represent the context, or state, of the client (or client application) when issuing the communication. The collector attaches this context/state to the query or other communication being provided from the client. The communication and attached state are sent from the client, at 1206. In some embodiments, the attached state may be considered to be part of or included in the communication sent from the client.

In some embodiments, other clients may receive the communication from the sending client, perform other functions and then issue another communication. Thus, multiple clients may send and receive a communication before the communication is provided to the wrapper or data source. At each client that includes a collector and that receives the communication, any outgoing communication is intercepted as in 1202, the context for that client is determined and attached to the communication as in 1204 and the communication and state/context sent as in 1206, via 1208. If only a single client having a collector sends the communication to the wrapper, then 1208 may be omitted. If five clients having collectors send the communication in series, then the originating client performs 1202, 1204 and 1206. 1208 may be repeated four times for the four additional clients receiving and sending the communication. If five clients, only four of which have collectors, receive the communication in series, then 1208 may be repeated three times. Thus, multiple clients may be involved in providing a communication to the data source. Each of the clients having a collector can attach their state to the communication. Further, the states may be attached in the order in which the clients sent/received the communication. The last client sending the communication provides the communication to a wrapper, such as wrapper 310.

Thus, using method 1200, the context for a client can be provided to along with the communication. For clients providing multiple communications, the series of contexts provided with these communications may represent typical behavior for the client during interaction with the data source. Thus, the client(s) may send information relating to their state and/or behavior in addition to communications such as queries.

FIG. 12B is a flow chart depicting an exemplary embodiment of method 1250 for performing behavioral baselining for a client. Method 1250 is described in the context of system 300. However, method 1250 may be used in connection with other systems including but not limited to systems 100 and 200 that employ collectors such as collectors 320. For simplicity, certain steps of method 1250 are depicted. Method 1250 may include other and/or additional steps and substeps. Further, the steps of method 1250 may be performed in another order including performing portions or all of some steps in parallel. In some embodiments, method 1250 may be considered to be used in implementing 506 of method 500. Method 1250 is described in the context of clients 306-2 and 306-3, collectors 320-2 and 320-3, service 314-2 and data source 302. Thus, method 1250 commences after collectors 320 have been provided on one or more clients 306 utilizing data sources. However, in other embodiments, other clients, collectors, service(s) and/or other data sources may be used. Method 1250 may be performed in conjunction with method 1200 and so may receive communications and states/contexts provided via method 1200.

The communication and context(s) of the client(s) are received at the wrapper, at 1252. The wrapper thus receives the communication, which may include multiple queries or method calls, as well as the states of all clients having collectors which sent the communication along before reaching the wrapper. In some embodiments, the communication and attached context(s) are received at the dispatcher. In some embodiments, the communication and attached context sent by the client at 1206 or 1208 of method 1200 is received at the wrapper at 1252.

The context(s) are forwarded from the dispatcher to behavioral baselining service(s), at 1254. In some embodiments, the communications with which the context(s) are associated are also provided to the behavioral baselining service(s) at 1254. Also at 1254, the dispatcher may send the communication on to the desired data source(s). Thus, processing of the query or other calls in the communication may not be delayed by inspection of the context(s) of clients and other functions performed by behavioral baselining service(s). In other embodiments, the communication may be held at the dispatcher until behavioral baselining is completed. This may occur, for example, if the dispatcher is in step mode described above.

The state(s)/context(s) for the client(s) associated with the communication are compared with baseline(s) for client(s), at 1256. In some embodiments, the communication is also part of this comparison. For example, the particular query of the database provided by the client as well as the state of the client may be used for comparison with the baseline. In other embodiments, just the context(s) might be used. In some embodiments, a single context of a client associated with a single communication is compared to the baseline(s) at 1256. In other embodiments, multiple contexts that may be in a particular order of a client are compared to the baseline at 1256. For example, the behavioral baselining service may store the context received for each communication for each client having a collector. Frequently, a client issues multiple communications for a data source when utilizing the data source. A set of these contexts for a particular client represents the behavior of that client around the time the client interacts with the data source. The behavioral baselining service analyzes the behavior (series of contexts) of the client(s) providing the communication(s). In some embodiments, only the identities of the contexts are used. In some embodiments, the identities of the contexts as well as their order are used for comparison. In some embodiments, the behavioral baselining service compares the context(s) to the behavior based upon a model of the behavior (the series of states/contexts), such as a Hidden Markov Model. Thus, in 1256 the behavioral baselining service maintains a model of requesting client(s)' behavior and compares the context in the current communication to the behavior. In some embodiments, a single context may be compared to the baseline in some cases and behavior in others. For example, for a first communication received by the wrapper, that first communication may be compared to the baseline. As additional communications are received, these communications may be compared to the baseline at 1256. In other embodiments, a client might first be authenticated and granted access to a data source based on another method of authentication, such as MFA. Once the client sends additional communication(s) with additional context(s), these communication(s) and context(s) may be used to compare the behavior for the client with the baseline. In some embodiments, the initial communication and authentication may be considered part of the behavior. In other embodiments, the initial communication and authentication may be considered separately from subsequent communication(s) and state(s).

If the context(s) for the current communication(s) sufficiently match the behavior, then the requesting client(s) are allowed access to the data source, at 1258. Thus, the data source is allowed to service the communication(s) provided by the client(s). If it is determined in 1256 that the context does not sufficiently match the behavior, then the desired action is taken, at 1260. In some embodiments, the action taken may depend upon the mismatch determined in 1256 or on other factors. For example, the client(s) initiating the communication(s) may not be allowed to access the data source. In such cases, the dispatcher may be informed and the corresponding routine used to terminate the connection to client(s). If the communication had already been forwarded to the data source(s), then the communication may be recalled from the data source(s). If the client had previously been authenticated, then the authentication may be revoked. In such embodiments, the dispatcher may be informed the client is unauthorized and the corresponding routine used to terminate the connection to client(s). Communication(s) that had been forwarded to the data source(s) may also be recalled from the data source(s). If the mismatch is sufficiently great or occurs greater than a threshold number of times, or at least a particular number of times in a row, then the client(s) may be blacklisted. In some embodiments, a secondary mechanism of authentication, such as MFA, may be invoked at 1260. Thus, access to the data source(s) may be determined at least in part based upon behavior of the requesting client(s). These and/or other actions may be taken at 1260.

The model/baseline may be updated, at 1262. For example, if it is determined that the context sufficiently matches the behavior at 1258, then the model/baseline may be updated with the context in the communication from client(s). If the context is considered inconsistent with the baseline, then the model/baseline may be updated with this information.

For example, suppose collector 320-2 in client 306-2 intercepts a communication including a query of data source 302 at 1202. The context of client 306-2 is determined by collector 320-2 and attached to the query. Client 306-2 then provides the communication and context to wrapper 310. Because client 306-2 provides the communication to wrapper 310 without providing the communication to another client 306, 1208 is skipped. Dispatcher 312 receives the communication at 1252 and provides the communication and context to behavioral baselining service 314-2 at 1254. The communication is also passed to data source 302 at 1254. Behavioral baselining service 314-2 compares the context received at 1254 to the baseline for client 306-2 at 1256. If the context received is consistent with the baseline, then access is allowed to data source 302, at 1258. Otherwise, access may be denied, for example the connection terminated, at 1260. Additional actions may also be taken at 1260 such as blacklisting client 306-2. The baseline may also be updated at 1262.

In some cases, multiple applications in multiple clients may pass a communication before the communication is sent to a data source. For example, this may occur where microservices are employed, as discussed above. For example, suppose collector 320-2 in client 306-2 intercepts the communication including a query of data source 302 at 1202. The state of client 306-2 is determined by collector 320-2 and attached to the query. Client 306-2 then provides the communication and state to client 306-3. In some cases, client 306-3 may add another query to the communication or otherwise modify the communication. Collector 320-3 in client 306-3 intercepts the communication, attaches the state of client 306-3 and provides the communication to wrapper 310 at 1208. Thus, the communication now includes the states of clients 306-2 and 306-3. If client 306-2 or 306-2 had passed the communication to client 306-4, which does not include a collector, then 1208 would be skipped for client 306-4 because no collector is present to determine and attach the state of client 306-4 to the communication. Dispatcher 312 receives the communication at 1252 and provides the communication and states to behavioral baselining service 314-2 at 1254. The communication is also passed to data source 302 at 1254. Behavioral baselining service 314-2 compares the states received at 1254 to the baselines for clients 306-2 and 306-3 at 1256. If the states received are consistent with the baselines, then access is allowed to data source 302, at 1258. Otherwise, access may be denied, for example the connection terminated and the communication recalled from data source 302, at 1260. Additional actions may also be taken at 1260 such as blacklisting client 306-2 and/or 306-3. The baseline(s) may also be updated at 1262.

Using methods 1200 and 1250, security and performance for data sources may be improved. The context(s)/state(s) of client(s) in communications requesting access to data source(s) may be analyzed to determine whether the communication is consistent with previous behavior of client(s). If the state(s) of the client(s) are inconsistent with the baseline, then access to the data source(s) may be prevented and/or additional action taken. Methods 1200 and 1250 may also be extended to compare behavior (a series of states, for example for multiple queries) of clients to previous behavior and authenticate clients based upon their behavior. Thus, attacks from a client that has been hijacked may be detected and addressed. Further, collectors need not be present on all clients to enhance security. Instead, if a sufficiently high fraction of clients include collectors, data sources may be protected in a manner akin to herd immunity. Methods 1200 and/or 1250 may be coupled with other methods, such as query analysis in method 900, authentication using method 400, tokenization in method 1100 and/or MFA in method 600 to further improve security.

As indicated above, various services may be combined. For example, wrapper 310 may provide multifactor authentication and/or federated identity management via service 314-1, query analysis via service 314-2, query rewriting via service 314-3 (or as part of service 314-2), behavioral baselining via service 314-4, tokenization of sensitive data via service 314-5, and/or other service other functionality via service 314-6. In such embodiments, dispatcher 312 may forward some or all of the request to multiple services 314 and/or services 314 may communicate with other services in order to perform the desired functions. Thus, performance of and security for data sources 302 and/or 304 may be improved by a variety of services without altering data sources 302 and/or 304. Moreover, new services may be added to wrapper 310 for data source(s) 302 and/or 304 by adding service module or updating services 314. These new services may be added without altering the code of data sources 302 and 304. Thus, performance, security and/or other features of system 300 can continue to be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a communication for a data source at a wrapper, the wrapper including a dispatcher and a service, the dispatcher receiving the communication and being data agnostic, the communication corresponding to end user credentials for an end user;
providing the communication from the dispatcher to the data source and to the service;
authenticating, using the service, the end user based on the end user credentials and utilizing federated identity management;
performing a read only binding of the service to a federated identity management data source; and
preventing access to the data source if the end user is not authenticated utilizing the federated identity management;
wherein authenticating, using the service, the end user based on the end user credentials and utilizing federated identity management further comprises:
providing the end user credentials to the federated identity management data source; and
searching, using the read only binding, the federated identity management data source for the end user.

2. The method of claim 1, further comprising:
accessing the data source by the wrapper as a proxy for the end user if the end user is authenticated using the federated identity management.

3. The method of claim 2, further comprising:
logging end user activities for the data source.

4. The method of claim 1, wherein:
searching the federated identity management data source for the end user further comprises:
searching the federated identity management data source for at least one group to which the end user belongs.

5. The method of claim 1, further comprising:
binding the service to the federated identity management data source as a proxy for the end user if the end user is authenticated.

6. A system, comprising:
a processor configured to:
receive a communication for a data source at a wrapper, the wrapper including a dispatcher and a service, the dispatcher receiving the communication and being data agnostic, the communication corresponding to end user credentials for an end user;
provide the communication from the dispatcher to the data source and to the service;
authenticate, using the service, the end user based on the end user credentials and utilizing federated identity management;
perform a read only binding of the service to a federated identity management data source; and
prevent access to the data source if the end user is not authenticated utilizing the federated identity management; and
a memory coupled to the processor and configured to provide the processor with instructions;
wherein to authenticate, using the service, the end user based on the end user credentials and utilizing federated identity management the processor is further configured to:
provide the end user credentials to the federated identity management data source; and
search, using the read only binding, the federated identity management data source for the end user.

7. The system of claim 6, wherein the processor is further configured to:
access the data source by the wrapper as a proxy for the end user if the end user is authenticated using the federated identity management.

8. The system of claim 7, wherein the processor is further configured to:
log end user activities for the data source.

9. The system of claim 6, wherein to search the federated identity management data source for the end user the processor is further configured to:
search the federated identity management data source for at least one group to which the end user belongs.

10. The system of claim 6, wherein the processor is further configured to:
bind the service to the federated identity management data source as a proxy for the end user if the end user is authenticated.

11. A computer program product, the computer program product being embodied in a non-transitory computer readable storage medium and comprising computer instructions for:
receiving a communication for a data source at a wrapper, the wrapper including a dispatcher and a service, the dispatcher receiving the communication and being data agnostic, the communication corresponding to end user credentials for an end user;

providing the communication from the dispatcher to the data source and to the service;

authenticating, using the service, the end user based on the end user credentials and utilizing federated identity management;

performing a read only binding of the service to a federated identity management data source; and preventing access to the data source if the end user is not authenticated utilizing the federated identity management;

wherein authenticating, using the service, the end user based on the end user credentials and utilizing federated identity management further comprises:

providing the end user credentials to the federated identity management data source; and searching, using the read only binding, the federated identity management data source for the end user.

12. The computer program product of claim 11, wherein the computer instructions further include computer instructions for:

accessing the data source by the wrapper as a proxy for the end user if the end user is authenticated using the federated identity management.

13. The computer program product of claim 12, wherein the computer instructions further include computer instructions for:

logging end user activities for the data source.

14. The computer program product of claim 11, wherein the computer instructions for searching the federated identity management data source for the end user further comprises further include computer instructions for:

searching the federated identity management data source for at least one group to which the end user belongs.

15. The computer program product of claim 11, wherein the computer instructions further include computer instructions for:

binding the service to the federated identity management data source as a proxy for the end user if the end user is authenticated.

* * * * *